(12) United States Patent
Hu et al.

(10) Patent No.: US 8,221,615 B2
(45) Date of Patent: Jul. 17, 2012

(54) GASOLINE SULFUR REDUCTION CATALYST FOR FLUID CATALYTIC CRACKING PROCESS

(75) Inventors: Ruizhong Hu, Woodstock, MD (US); Richard Franklin Wormsbecher, Dayton, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/019,062

(22) Filed: Feb. 1, 2011

(65) Prior Publication Data

US 2011/0120911 A1  May 26, 2011

Related U.S. Application Data

(62) Division of application No. 11/884,975, filed on Aug. 23, 2007, now Pat. No. 7,902,106.

(51) Int. Cl.
*C10G 11/05* (2006.01)
*C10G 11/18* (2006.01)
*B01J 29/08* (2006.01)
*B01J 29/16* (2006.01)

(52) U.S. Cl. ......... 208/120.01; 208/120.05; 208/120.25; 502/65; 502/73; 502/79

(58) Field of Classification Search .................... 502/65, 502/73, 79; 208/113, 118, 119, 120.01, 120.05, 208/120.25
See application file for complete search history.

(56) References Cited

U.S. PATENT DOCUMENTS

| 3,293,192 A | 12/1966 | Maher et al. ................. 252/430 |
| 3,402,996 A | 9/1968 | Maher et al. ..................... 23/112 |
| 3,607,043 A | 9/1971 | McDaniel et al. ............... 23/111 |
| 3,676,368 A | 7/1972 | Scherzer et al. ........... 252/455 Z |
| 3,804,780 A | 4/1974 | Wilson et al. ............. 252/455 Z |
| 4,340,465 A | 7/1982 | Miller et al. .................... 208/120 |
| 4,405,443 A | 9/1983 | Bertolacini et al. .......... 208/113 |
| 4,542,116 A | 9/1985 | Bertolacini et al. ............. 502/65 |
| 4,664,780 A | 5/1987 | Lochow et al. ................ 208/120 |
| 4,764,269 A | 8/1988 | Edwards et al. ............... 208/120 |
| 4,790,982 A | 12/1988 | Yoo et al. ....................... 423/239 |
| 4,793,827 A | 12/1988 | Lochow et al. ................... 44/65 |
| 4,957,718 A | 9/1990 | Yoo et al. ....................... 423/244 |
| 4,957,892 A | 9/1990 | Yoo et al. ......................... 502/63 |
| 4,963,520 A | 10/1990 | Yoo et al. ......................... 502/64 |
| 5,021,146 A | 6/1991 | Chin .............................. 208/122 |
| 5,037,531 A | 8/1991 | Bundens et al. ............... 208/120 |
| 5,037,538 A | 8/1991 | Chin et al. ..................... 208/113 |
| 5,258,341 A | 11/1993 | Chitnis et al. .................... 502/68 |
| 5,294,332 A | 3/1994 | Klotz ............................. 208/120 |
| 5,376,608 A | 12/1994 | Wormsbecher et al. ......... 502/61 |
| 5,525,210 A | 6/1996 | Wormsbecher et al. ...... 208/122 |
| 5,908,547 A | 6/1999 | Chitnis et al. ............. 208/120.01 |
| 6,096,194 A | 8/2000 | Tsybulevskiy et al. ....... 208/244 |
| 6,214,211 B1 | 4/2001 | Itoh ................................. 208/118 |
| 6,482,315 B1 | 11/2002 | Roberie et al. ................. 208/249 |
| 6,528,447 B1 | 3/2003 | Ghosh et al. ..................... 502/65 |
| 6,635,168 B2 | 10/2003 | Zhao et al. ................ 208/120.01 |
| 6,635,169 B1 | 10/2003 | Bhore et al. ................ 208/120.2 |
| 6,776,899 B2 | 8/2004 | Lam et al. ................. 208/120.01 |
| 2002/0043154 A1 | 4/2002 | Shore .............................. 95/135 |
| 2002/0153282 A1 | 10/2002 | Cheng et al. ............... 208/120.2 |
| 2002/0179498 A1 | 12/2002 | Chester et al. ................ 208/230 |
| 2005/0205464 A1 | 9/2005 | Hu ................................. 208/113 |

FOREIGN PATENT DOCUMENTS

| JP | 2004066035 | 3/2004 |
| SU | 01786718 | 1/1991 |
| WO | 02 08300 | 1/2002 |

OTHER PUBLICATIONS

Krishna et al., "Additives Improved FCC Process/Hydrocarbon Process", Hydrocarbon Processing, Nov. 1991, pp. 59-66.
American Chemical Society Symposium Series, Contaminant-Metal Deactivation and Metal-Dehydrogenation Effects During Cyclic Propylene Steaming of Fluid Catalytic Cracking Catalyst No. 634, Chapter 12, pp. 171-183 (1996) by L.T. Boock, T.F. Petti, and J.A. Rudesill.
Breck, D.W., "Zeolite Molecular Sieves", Structural Chemistry & Use (1974) p. 94.
Albro et al. "Quantitative Determination of Sulfur Compounds in FCC Gasolines by AED — A Study of the Effect of Catalyst Type & Catalytic Conditions on Sulfur Distribution", Journal of High Resolution Chromatography, vol. 16, Jan. 1993.
Studies in Surface Science and Catalysis, "Fluid Catalytic Cracking: Science and Technology", vol. 76, Ch 4, p. 141, Ed. Magee, J.S. and Mitchell, Jr., M.M., (1993).
Wormsbecher et al., National Petroleum Refiners Mtg., New Orleans, paper AM-92-15 (1992).
"Commercial Preparation and Characterization of FCC Catalysts", Fluid Catalytic Cracking: Science and Technology, Studies in Surface Science and Catalysis, vol. 76, p. 120 (1993).
Krishna, Sadeghbeigi, op cit & Scherzer, "Octane Enhancing Zeolitic FCC Catalysts", Marcel Dekker, New York, 1990, ISBN 0-8247-8399-9, pp. 165-178.

*Primary Examiner* — Walter D Griffin
*Assistant Examiner* — Renee E Robinson
(74) *Attorney, Agent, or Firm* — Charles A. Cross

(57) ABSTRACT

The invention is a composition that is suitable for reducing sulfur species from products produced by petroleum refining processes, especially gasoline products produced by fluidized catalytic cracking (FCC) processes. The composition comprises zeolite, yttrium, and at least one element selected from the group consisting of zinc, magnesium and manganese, wherein the yttrium and element are present as cations. The yttrium and zinc are preferably present as cations that have been exchanged onto the zeolite. The zeolite is preferably a zeolite Y.

20 Claims, 10 Drawing Sheets

GASOLINE SULFUR REDUCTION CATALYST FOR FLUID CATALYTIC CRACKING PROCESS

This application is a divisional of U.S. patent application Ser. No. 11/884,975 filed Aug. 23, 2007 now U.S. Pat. No. 7,902,106

FIELD OF THE INVENTION

The present invention is directed to an improved catalyst composition useful in fluid catalytic cracking processes. The present catalyst composition is capable of reducing sulfur compounds normally found as part of the gasoline fraction streams of such processes. The present invention accordingly provides product streams of light and heavy gasoline fractions with substantially lower amounts of sulfur-containing compounds, and an improved catalytic cracking process when the invention is used as a catalyst in such processes.

BACKGROUND OF THE INVENTION

Catalytic cracking is a petroleum refining process that is applied commercially on a very large scale. Indeed, fluidized catalytic cracking (FCC) processes produce a large amount of the refinery gasoline blending pool in the United States. In the process, heavy hydrocarbon feedstocks are converted into lighter products by reactions taking place at elevated temperatures in the presence of a catalyst, with the majority of reactions taking place in the vapor phase. The feedstock is thereby converted into gasoline, distillates and other liquid fraction product streams as well as lighter gaseous cracking products having four or less carbon atoms per molecule. The three characteristic steps of a catalytic cracking process comprises: a cracking step in which the heavy hydrocarbon feed stream is converted into lighter products, a stripping step to remove adsorbed hydrocarbons from the catalyst material, and a regeneration step to burn off coke formations from the catalyst material. The regenerated catalyst is then recirculated and reused in the cracking step.

Catalytically cracked feedstocks normally contain organic sulfur compounds, such as mercaptans, sulfides, thiophenes, benzothiophenes, dibenzothiophenes, and other sulfur-containing species. The products of the cracking process correspondingly tend to contain sulfur impurities even though about half of the sulfur compounds are converted to hydrogen sulfide during the cracking process, mainly by catalytic decomposition of non-thiophenic sulfur compounds. See, Wormsbecher et al., National Petroleum Refiners Meeting, New Orleans, paper AM-92-15 (1992). The thiophenic compounds have been found to be most difficult to remove. The specific distribution of sulfur in the cracking products is dependent on a number of factors including feed, catalyst type, additives present, conversion and other operating conditions, but, in any event a certain proportion of the sulfur tends to enter the light or heavy gasoline fractions and passes over into the product pool, including sulfur from light cycle oil fractions, discussed later below.

Although petroleum feedstock normally contains a variety of sulfur bearing contaminants, one of the chief concerns is the presence of unsubstituted and hydrocarbyl substituted thiophenes and their derivatives, such as thiophene, methylthiophene, ethylthiophene, propylthiophene, tetrahydrothiophene, benzothiophene and the like in the heavy and light gasoline fraction product streams of FCC processes. The thiophenic compounds generally have boiling points within the range of the light and heavy gasoline fractions and, thus, become concentrated in these product streams. With increasing environmental regulation being applied to petroleum products, for example in the Reformulated Gasoline (RFG) regulations, there has been numerous attempts to reduce the sulfur content of the products, especially those attributable to thiophenic compounds.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach has been to remove the sulfur from the cracked products by hydrotreating. Again, while effective, this solution has the drawback that valuable product octane may be lost when the high octane olefinic components become saturated.

From an economic point of view, it would be desirable to achieve thiophenic sulfur removal in the cracking process itself since this would effectively desulfurize the major components of the gasoline blending pool without additional treatment. Various catalytic materials have been developed for the removal of sulfur during the FCC process cycle. For example, an FCC catalyst impregnated with vanadium has been shown to reduce the level of product sulfur (See U.S. Pat. No. 6,482,315). This reference also discloses a sulfur reduction additive based on a zinc-impregnated alumina.

Other developments for reducing product sulfur have centered on the removal of sulfur from the regenerator stack gases. An early approach developed by Chevron used alumina compounds as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed (See Krishna et al., *Additives Improved FCC Process*, Hydrocarbon Processing, November 1991, pages 59-66). Although sulfur is removed from the stack gases of the regenerator, liquid product sulfur levels are not greatly affected, if at all.

An alternative technology for the removal of sulfur oxides from regenerator stack gases is based on the use of magnesium-aluminum spinels as additives to the circulating catalyst inventory in the FCC unit (FCCU). Exemplary patents disclosing this type of sulfur removal additives include U.S. Pat. Nos. 4,963,520; 4,957,892; 4,957,718; 4,790,982 and others. Again, however, sulfur content in liquid products, such as gasoline, was not greatly affected.

A catalyst composition to reduce sulfur levels in liquid cracking products has been described by Wormsbecher and Kim in U.S. Pat. Nos. 5,376,608 and 5,525,210. These patents propose the addition of low amounts of an additive composed of an alumina-supported Lewis Acid to conventional zeolite-containing cracking catalyst. Although this system has the advantages of causing sulfur reduction in the cracking process, it is generally believed that use of greater than about 10 weight percent of the described additives in the catalyst composition does not provide a benefit (e.g. high sulfur removal while retaining the selectivity of other products) proportional to the level of the additive. In view of the fact that an FCCU can only contain a fixed amount of fluidized particulates, the inclusion of additives, such as the alumina-supported Lewis Acid additives of Wormsbecher and Kim, causes a reduction in the amount of the base cracking catalyst contained in the FCCU and thus, a proportional reduction in the conversion of heavy feedstock to desired products.

U.S. Pat. No. 6,635,168 discloses a FCC catalyst composition composed of Lewis Acid-containing alumina and Y-type zeolite containing catalyst to provide a composition having a kinetic conversion activity of at least 2. This product was developed in part to address disadvantages associated with the aforementioned Lewis Acid components. Indeed, the compositions described in U.S. Pat. No. 6,635,168 provide a reduced sulfur (e.g., thiophenes and derivatives thereof) content in light and heavy gasoline fractions of the FCC processes, (about 34%).

Pending U.S. patent application Ser. No. 10/801,424 filed on Mar. 16, 2004 discloses a gasoline sulfur reduction cracking catalyst composition comprising a zeolite in combination with a Lewis Acid containing component, wherein the cracking catalyst composition comprises 0.2% $Na_2O$ or less. It has been found that sulfur compounds in hydrocarbon feeds to fluid catalytic cracking processes can be reduced by at least 15% compared to the same composition, which does not comprise the aforementioned Lewis Acid containing component.

The aforementioned gasoline sulfur product pertains to Lewis Acid supported on non-zeolitic supports. It has also been described, however, that Lewis Acid based gasoline sulfur reduction products can be prepared by associating Lewis Acid with zeolite, and in particular rare earth exchanged zeolites. It has now been discovered that, depending on the loading of Lewis Acid, e.g., zinc-based compounds, and any rare earth present, the gasoline sulfur reduction (GSR) activity of these catalysts can be dramatically decreased after hydrothermal deactivation due to diminishing amount of available zeolite exchange sites after severe dealumination or a dramatic reduction of zeolite surface area. Even in the cases where the amounts of Lewis Acid and any rare earth are carefully optimized to maximize the hydrothermal stability of such catalysts, the sulfur reduction activity of a catalyst, e.g., Zn exchanged RE-USY catalysts, can be substantially reduced after hydrothermal deactivation, which has a redox cycle built in. A FCC catalyst constantly goes through alternative reduction and oxidation cycles under hydrothermal conditions in a FCC process and therefore avoiding these cycles is not usually possible. These shortcomings have limited the use of these types of catalysts.

It also has been found that the aforementioned low soda embodiments are only reducing specific species of sulfur compounds, and it would be desirable to find a catalyst capable of reducing a wider variety of sulfur containing species, e.g., LCO sulfur.

Sulfur standards are becoming more stringent as evidenced by the fact that the U.S. Environmental Protection Agency has set new standards for gasoline sulfur content and is reducing the average from the current standard of 350 ppm sulfur to about 30 ppm by 2006. It therefore would be desirable to have a catalyst composition suitable for use in FCC processes wherein the catalyst is capable of significantly reducing the level sulfur even further than those achieved using additives described in WO 02/08300, especially reducing the level of thiophenes, and their derivatives from light and heavy gasoline fractions while substantially retaining conversion of feedstock to desired product, e.g., substantially reducing the levels of thiophene and its derivatives as part of the functions of the FCC process while substantially maintaining the overall cracking activity and product selectivities. It is also desirable to have an additive possessing sulfur reduction activity that does not substantially degrade in relatively short periods of time, i.e., the additive's sulfur reduction activity is maintained over longer periods of time.

SUMMARY OF THE INVENTION

Figure 1:
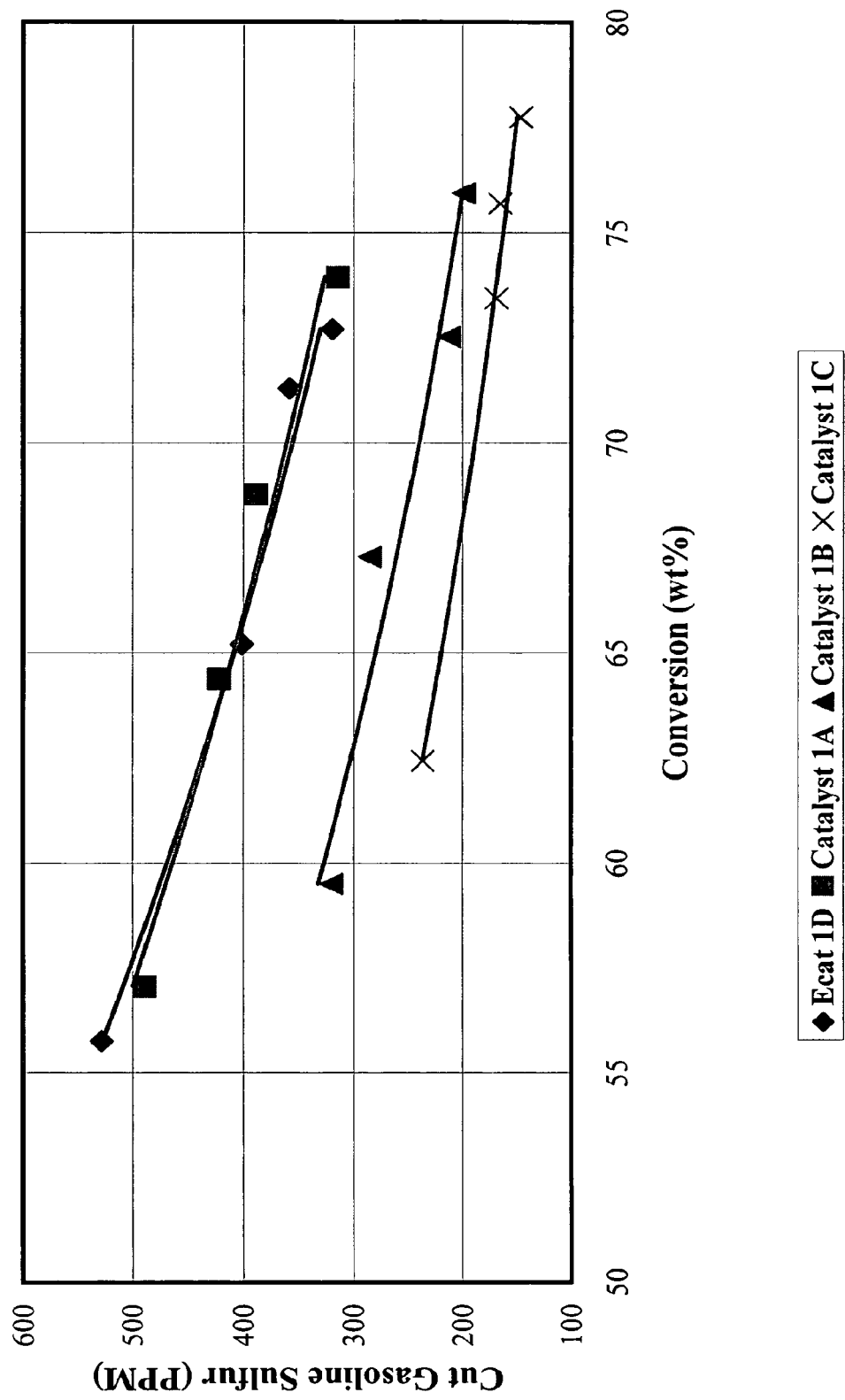
FIG. 1 illustrates hydrocarbon conversion (wt %) and cut gasoline sulfur reduction performance of the invention (Catalyst 1C of Example 1) versus a base equilibrium catalyst (E-cat 1D) and other catalysts (Catalyst 1A & 1B) using deactivation Protocol 1 described later below (CPS 1450° F. (788° C.) ending on reduction).

The present invention is an improved cracking catalyst composition comprising zeolite, yttrium, and at least one element selected from the group consisting of zinc, magnesium, and manganese, wherein the yttrium and the element are present as cations. The catalyst composition preferably comprises zinc as the aforementioned element in amounts of about 0.1% to about 14%. The catalyst also preferably comprises about 0.1% to about 12% by weight yttrium. The element and yttrium are generally present in the composition as cations that have been exchanged onto the zeolite. The zeolite is preferably zeolite Y. The invention can further contain rare earth, e.g., when rare earth exchanged Y zeolite is employed. The composition is particularly suited for use in a fluidized catalytic cracking process (FCC). Accordingly preferred embodiments of the invention comprise fluidizable particles having an average particle size in the range of about 20 to about 100 microns, and further comprise matrix and optionally binder, e.g., clay and alumina.

The invention also provides for a new method of reducing the sulfur content of a catalytically cracked petroleum fraction, which comprises catalytically cracking a petroleum feed fraction containing organosulfur compounds at elevated temperature in the presence of a cracking catalyst comprising zeolite, yttrium, and at least one element selected from the group consisting of zinc, magnesium, and manganese, wherein the yttrium and element are present as cations.

The invention further comprises a new fluid catalytic cracking process in which a hydrocarbon feed comprising organosulfur compounds is catalytically cracked to lighter products by contact in a cyclic catalyst recirculation cracking process with a circulating fluidizable catalytic cracking catalyst inventory consisting of particles having a size ranging from about 20 to about 100 microns, comprising: (i) catalytically cracking the feed in a catalytic cracking zone operating at catalytic cracking conditions by contacting feed with a source of regenerated cracking catalyst to produce a cracking zone effluent comprising cracked products and spent catalyst containing coke and strippable hydrocarbons; (ii) discharging and separating the effluent mixture into a cracked product rich vapor phase and a solids rich phase comprising spent catalyst; (iii) removing the vapor phase as a product and fractionating the vapor to form liquid cracking products including gasoline, (iv) stripping the solids rich spent catalyst phase to remove occluded hydrocarbons from the catalyst, (v) transporting stripped catalyst from the stripper to a catalyst regenerator; (vi) regenerating stripped catalyst by contact with oxygen containing gas to produce regenerated catalyst; and (vii) recycling the regenerated catalyst to the cracking zone to contact further quantities of heavy hydrocarbon feed, the improvement which comprises reducing the sulfur content of a the gasoline portion of the liquid cracking products, by catalytically cracking the feed fraction at elevated temperature in the presence of a product sulfur reduction catalyst which comprises zeolite, yttrium, and at least one element selected from the group consisting of zinc, magnesium, and manganese, wherein the yttrium and element are present as cations.

DETAILED DESCRIPTION OF THE INVENTION

The present invention is preferably in a form capable of being maintained within a FCC unit. FCC catalysts typically contain zeolite, which is a fine porous powdery material composed of the oxides of silicon and aluminum. The zeolites are typically incorporated into matrix and/or binder and particulated, or, a clay based particulate can be "zeolitized" after microspheres are formed. See "Commercial Preparation and Characterization of FCC Catalysts", *Fluid Catalytic Cracking: Science and Technology*, Studies in Surface Science and Catalysis, Vol. 76, p. 120 (1993). When either embodiment of the aforementioned zeolite particulates is aerated with gas, the particulated catalytic material attains a fluid-like state that allows the material to behave like a liquid. This property permits the catalyst to have enhanced contact with the hydrocarbon feedstock feed to the FCC unit and to be circulated between the FCC reactor and the other units of the overall FCC process (e.g., regenerator). Hence, the term "fluid" has been adopted by the industry to describe this material. FCC catalysts typically have average particle sizes in the range of about 20 to about 100 microns. While the compositions of this invention have shown to be particularly suitable for use in FCC, it is envisioned that the composition can be used in other catalytic hydrocarbon conversion processes where it is desirable to produce low sulfur products.

Zeolite

The zeolite suitable for preparing this invention can be any zeolite having catalytic activity in a hydrocarbon conversion process. The zeolite should be one capable of being exchanged with yttrium and other cations required to make the invention. Generally, the zeolites can be large pore size zeolites that are characterized by a pore structure with an opening of at least 0.7 nm and medium or intermediate pore size zeolites having a pore size smaller than 0.7 nm but larger than about 0.56 nm. Suitable large pore zeolites are described further below. Suitable medium pore size zeolites include pentasil zeolites such as ZSM-5, ZSM-22, ZSM-23, ZSM-35, ZSM-50, ZSM-57, MCM-22, MCM-49, MCM-56 all of which are known materials. Other zeolites that may be used also include those zeolites with framework metal elements other than aluminum, for example, boron, gallium, iron, chromium.

Suitable large pore zeolites comprise crystalline aluminosilicate zeolites such as synthetic faujasite, i.e., type Y zeolite, type X zeolite, and Zeolite Beta, as well as heat treated (calcined) and/or rare-earth exchanged derivatives thereof. Zeolites that are particularly suited include calcined, rare-earth exchanged type Y zeolite (CREY), the preparation of which is disclosed in U.S. Pat. No. 3,402,996, ultra stable type Y zeolite (USY) as disclosed in U.S. Pat. No. 3,293,192, as well as various partially exchanged type Y zeolites as disclosed in U.S. Pat. Nos. 3,607,043 and 3,676,368. Other suitable large pore zeolites include MgUSY, ZnUSY, MnUSY, HY, REY, CREUSY, REUSY zeolites, and mixtures thereof. As is discussed in more detail below, a yttrium exchanged Y zeolite is particularly preferred. The zeolite of this invention may also be blended with molecular sieves such as SAPO and ALPO as disclosed in U.S. Pat. No. 4,764,269.

Standard Y-type zeolite is commercially produced by crystallization of sodium silicate and sodium aluminate. This zeolite can be converted to USY-type by dealumination, which increases the silicon/aluminum atomic ratio of the parent standard Y zeolite structure. Dealumination can be achieved by steam calcination or by chemical treatment. In embodiments where clay microspheres are "zeolitized" in situ to form zeolite Y, the zeolite Y is formed from calcined clay microspheres by contacting the microspheres to caustic solution at 180° F. (82° C.). See Studies in Surface Science and Catalysis, supra.

The rare earth exchanged zeolites used in the invention are prepared by ion exchange, during which sodium atoms present in the zeolite structure are replaced with other cations, usually as mixtures of rare-earth metal salts such as those salts of cerium, lanthanum, neodyminum, naturally occurring rare-earths and mixtures thereof to provide REY and REUSY grades, respectively. These zeolites may be further treated by calcinations to provide the aforementioned CREY and CREUSY types of material. MgUSY, ZnUSY and MnUSY zeolites can be formed by using the metal salts of Mg, Zn or Mn or mixtures thereof in the same manner as described above with respect to the formation of REUSY except that salts of magnesium, zinc or manganese is used in lieu of the rare-earth metal salt used to form REUSY.

The unit cell size of a preferred fresh Y-zeolite is about 24.45 to 24.7 Å. The unit cell size (UCS) of zeolite can be measured by X-ray analysis under the procedure of ASTM D3942. There is normally a direct relationship between the relative amounts of silicon and aluminum atoms in the zeolite and the size of its unit cell. This relationship is fully described in Zeolite Molecular Sieves, Structural Chemistry and Use (1974) by D. W. Breck at Page 94, which teaching is incorporated herein in its entirety by reference. Although both the zeolite, per se, and the matrix of a fluid cracking catalyst usually contain both silica and alumina, the $SiO_2/Al_2O_3$ ratio of the catalyst matrix should not be confused with that of the zeolite. When an equilibrium catalyst is subjected to x-ray analysis, it only measures the UCS of the crystalline zeolite contained therein.

The unit cell size value of a zeolite also decreases as it is subjected to the environment of the FCC regenerator and reaches equilibrium due to removal of the aluminum atoms from the crystal structure. Thus, as the zeolite in the FCC inventory is used, its framework Si/Al atomic ratio increases from about 3:1 to about 30:1. The unit cell size correspondingly decreases due to shrinkage caused by the removal of aluminum atoms from the cell structure. The unit cell size of a preferred equilibrium Y zeolite is at least 24.22 Å, preferably from 24.28 to 24.50 Å, and more preferably from 24.28 to 24.38 Å.

Yttrium and Element (Zn, Mg, and Mn)

Yttrium can be present in the composition in amounts ranging from about 0.1% to about 12% by weight of the composition. The element selected from the group consisting of zinc, magnesium and manganese can be present in the composition in amounts ranging from about 0.1% to about 14% by weight composition.

The specific amount of yttrium and the aforementioned element for a particular embodiment depends on a number of factors, including, but not limited to, the amount of zeolite present, the ion exchange capacity of the selected zeolite and, with respect to the aforementioned element, which element is selected. For example, if zinc is selected as the aforementioned element, the amount of zinc is generally in the range of 0.1 to about 14% by weight, whereas the amount of magnesium is generally in the range of about 0.1 to about 5% and the amount of manganese is about 0.1 to about 12%. Given that the selected zeolite has a specific ion exchange capacity, if one chooses a particular amount of yttrium, the maximum amount of the aforementioned element is dependent on the particular amount chosen for yttrium. The vice versa is true if one chose a particular amount of the aforementioned element. In embodiments comprising yttrium and zinc, the catalyst typically comprises about 0.5% to about 5% by weight yttrium and about 1.5% to about 5% by weight zinc.

The amount of the aforementioned element and yttrium can alternatively be measured as an oxide in amounts measured in grams per square meter of catalyst surface area. For example, the aforementioned element and yttrium can each be present in amounts of at least about $1 \times 10^{-5}$ gr/m² of total catalyst surface area. More typically, zinc can be found in amounts of at least about $1.6 \times 10^{-4}$ gr/m², magnesium in amounts of at least about $5 \times 10^{-5}$ gr/m², manganese in amounts of at least about $1.3 \times 10^{-4}$ gr/m², and yttrium in amounts of at least about $7 \times 10^{-4}$ gr/m². The weight and surface area are measured, respectively, by ICP and BET surface area methodologies.

In general, the yttrium and the aforementioned element(s) are present as cations exchanged onto the zeolite, but depending on the method used, a portion of the yttrium and the element could be found in pores of the catalyst matrix. In those instances the yttrium and/or elements are usually part of a solid solution with the matrix, and up to about 25% of the yttrium and/or element present in the composition could be in this form. However, when making catalysts designed for FCC processes, it is generally desirable to minimize the amount of yttrium and/or the element in this form to minimize their side effects in FCC processes.

Optional Components

The catalyst can also comprise additional components, including, but not limited to, matrix and/or binders. Suitable matrix materials include, but are not limited to, active matrices such as alumina, silica, porous alumina-silica, and kaolin clay. Alumina is preferred for some embodiments of the invention, and may form all or part of an active-matrix component of the catalyst. By "active" it is meant the material has activity in converting and/or cracking hydrocarbons in a typical FCC process.

Suitable binders include those materials capable of binding the matrix and zeolite into particles. Specific suitable binders include, but are not limited to, alumina sols, silica sols, aluminas, and silica aluminas.

Preparation of Invention

Methods for preparing the invention include, but are not necessarily limited to, the following general processes.

(1) Ion exchange a selected zeolite first by ion exchange with yttrium and the element selected from the group consisting of zinc, magnesium, and manganese, and then incorporating the ion exchanged zeolite into the optional components mentioned earlier and form a catalyst therefrom.

(2) Combining the zeolite, yttrium, and the aforementioned element with zeolite and optional components simultaneously and then form the desired catalyst.

(3) Manufacturing a zeolite-containing catalyst in a conventional manner, e.g., forming a zeolite catalyst comprising the zeolite and optional components mentioned earlier, and then subjecting the formed catalyst particles to ion exchange to include yttrium and the aforementioned element from the group consisting of zinc, magnesium, and manganese.

(4) Preparing a conventional catalyst as mentioned in (3), except impregnate the catalyst particle, e.g., via incipient wetness, with yttrium and the aforementioned element.

(5) A combination of two or more of the above, e.g., manufacturing a zeolite first by ion exchanging yttrium on the zeolite and then when combining the ion exchanged zeolite with the optional components, one also includes a salt of the aforementioned element selected from the group consisting of zinc, magnesium, and manganese.

When manufacturing FCC catalysts, spray drying is one process that can be used in any of the above-described methods to form the catalyst. For example, after combining the exchanged zeolite of (1) with the optional components in water, the resulting slurry can be spray dried into particles having an average particle size in the range of about 20 to about 100 microns, and the resulting catalyst particulate is then processed under conventional conditions.

The source of yttrium in any of the above methods is generally in the form of a yttrium salt, and includes, but is not limited to yttrium halides such as chlorides, fluorides, bromides, and iodides. Yttrium carbonate, sulfate, nitrates and acetates are also suitable sources. The source of the yttrium is usually aqueous based and yttrium can be present at concentrations of about 1 to about 30%. It is usually preferable to conduct the exchange such that at least 15% and up to about 75% of exchange sites present on the zeolite are exchanged with yttrium cations.

The source of the element selected from the group consisting of zinc, magnesium and manganese is also generally a salt, with halides, carbonates, sulfates, nitrates, acetate, and the like being suitable. The sources of these elements are also generally aqueous based and the element can be present at concentrations of about 1% to about 40%.

If one of the optional components is rare earth, the source of the rare earth is also generally a salt, with the counter anion being one of those mentioned above with respect to yttrium and the aforementioned element. Rare earth can be incorporated into the composition by any of the above-mentioned methods for incorporating yttrium and/or the element. For typical embodiments containing rare earth, the rare earth is introduced as pre-exchanged cation on the zeolite before matrix and other components in the invention are combined with the zeolite. When employing this modified method of making the catalyst. The starting zeolite can be a zeolite such as REY, REUSY, and CREY.

In the instance that matrix and binder are included, these materials are added to the mixture as dispersions, solids, and/or solutions. A suitable clay matrix comprises kaolin. Suitable materials for binders include inorganic oxides, such as alumina, silica, silica alumina, aluminum phosphate, as well as other metal-based phosphates known in the art. Suitable dispersible sols include alumina sols and silica sols known in the art. Suitable alumina sols are those prepared by peptizing alumina using strong acid and particularly suitable silica sols include Ludox® colloidal silica available from W.R. Grace & Co.-Conn. Certain binders, e.g., those formed from binder precursors, e.g., aluminum chlorohydrol, are created by introducing solutions of the binder's precursors into the mixer, and the binder is then formed upon being spray dried and/or further processed, e.g., calcination.

With respect to (4) of the aforementioned methods, one method of making the invention comprises spray drying a slurry of zeolite Y, rare earth, clay and alumina sol, and then washing and calcining the resulting particulates. The calcined particles are then subjected to a "post impregnation" solution comprising the yttrium and aforementioned element. Alternatively, the catalyst is made by sequentially impregnating each of the components onto the spray dried particle, e.g., first impregnating the catalyst particles with yttrium, then subsequently subjecting the yttrium impregnated catalyst with a bath containing at least one element selected from the group consisting of zinc, magnesium and manganese. The post impregnation solution concentrations depends on the incipient wetness process used, but in general, the concentration of yttrium and the aforementioned element is generally higher than that of the solutions used to directly exchange the zeolites. Alternatively, the yttrium and element is post exchanged onto zeolite as per (3) mentioned above using conventional ion-exchange conditions. Indeed when preparing zeolite Y in situ, this aforementioned method is employed except zeolite Y is not included and clay is not optional. The clay microspheres are then treated in caustic at elevated temperatures to form the zeolite prior to impregnation and/or ion exchange.

In general, the present catalyst is used as a catalytic component of the circulating inventory of catalyst in a catalytic cracking process, which is typically the fluid catalytic cracking (FCC) process. For convenience, the invention will be described with reference to the FCC process although the present catalyst could be used in a moving bed type (TCC) cracking process with appropriate adjustments in particle size to suit the requirements of the process. Apart from the addition of the present catalyst to the catalyst inventory and some possible changes in the product recovery section, discussed below, the manner of operating a FCC process will not be substantially different.

Briefly, the invention is suited for a fluid catalytic cracking process in which a heavy hydrocarbon feed containing the organosulfur compounds will be cracked to lighter products by contact of the feed in a cyclic catalyst recirculation cracking process with a circulating fluidizable catalytic cracking catalyst inventory consisting of particles having a size ranging from about 20 to about 100 microns. The significant steps in the cyclic process are: (i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons; (ii) the effluent is discharged and separated, normally in one or more cyclones, into a vapor phase rich in cracked product and a solids rich phase comprising the spent catalyst; (iii) the vapor phase is removed as product and fractionated in the FCC main column and its associated side columns to form liquid cracking products including gasoline, (iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed. In the present process, the sulfur content of the gasoline portion of the liquid cracking products, is effectively brought to lower and more acceptable levels by carrying out the catalytic cracking in the presence of the invention being used as a product sulfur reduction catalyst. The catalyst of this invention has been shown to not only reduce gasoline range sulfur, but also reduce LCO sulfur. LCO sulfur is not a particularly significant issue when the distillation process after a FCC unit results in relatively clean cuts. It is, however, not unusual that such distillations do not result in as clean a cut, that is, the gasoline fraction will frequently also contain LCO fraction. Therefore, employing a sulfur reduction catalyst in the FCC unit capable of reducing LCO sulfur is advantageous when one desires to reduce sulfur present in a range of species, particularly LCO sulfur carried over into the gasoline fraction from the distillation tower.

Because of the concern for excessive coke and hydrogen make during the cracking process, it is preferable that the form of zinc and yttrium for incorporation into the catalyst does not exhibit dehydrogenation activity to a marked degree.

Other catalytically active components may be present in the circulating inventory of catalytic material in addition to the cracking catalyst of this invention and/or may be included with the invention when the invention is being added to a FCC unit. Examples of such other materials include the octane enhancing catalysts based on zeolite ZSM-5, CO combustion promoters based on a supported noble metal such as platinum, stack gas desulfurization additives such as DESOX® (magnesium aluminum spinel), vanadium traps, bottom cracking additives, such as those described in Krishna, Sadeghbeigi, op cit and Scherzer, "Octane Enhancing Zeolitic FCC Catalysts", Marcel Dekker, N.Y., 1990, ISBN 0-8247-8399-9, pp. 165-178 and other gasoline sulfur reduction products such as those described in U.S. Pat. No. 6,635,169. These other components may be used in their conventional amounts.

The effect of the present catalyst is to reduce the sulfur content of the liquid cracking products, especially the light and heavy gasoline fractions although reductions are also noted in the light cycle oil, making this more suitable for use as a diesel or home heating oil blend component. Without being bound by any particular theory, it is believed that the sulfur removed by the use of the catalyst is converted to inorganic form and released as hydrogen sulfide which can be recovered in the normal way in the product recovery section of the FCCU in the same way as the hydrogen sulfide conventionally released in the cracking process. The increased load of hydrogen sulfide may impose additional sour gas/water treatment requirements but with the significant reductions in gasoline sulfur achieved, these are not likely to be considered limitative.

Very significant reductions in gasoline sulfur can be achieved by the use of the present catalysts, in some cases up to about 70% based on microactivity testing relative to the base case using a conventional cracking catalyst, at constant conversion, using the preferred form of the catalyst described above. Gasoline sulfur reduction of 30% is readily achievable with many of the additives according to the invention, as shown by the Examples below. The extent of sulfur reduction may depend on the original organic sulfur content of the cracking feed and the FCC process conditions.

Sulfur reduction may be effective not only to improve product quality but also to increase product yield in cases where the refinery cracked gasoline end point has been limited by the sulfur content of the heavy gasoline fraction; by providing an effective and economical way to reduce the sulfur content of the heavy gasoline fraction, the gasoline end point may be extended without the need to resort to expensive hydrotreating, with a consequent favorable effect on refinery economics. Removal of the various thiophene derivatives which are refractory to removal by hydrotreating under less severe conditions is also desirable if subsequent hydrotreatment is contemplated.

The following advantages can also be recognized when using gasoline sulfur reduction additives. For example, catalytic gasoline sulfur reduction in the FCCU can allow the refiner to process a higher sulfur feedstock. These sour feedstocks are typically less expensive and thus have a favorable economic benefit to the refiner. Gasoline sulfur reduction in the FCCU can also positively impact the operation of downstream naphtha hydrotreaters. By achieving a large portion of the required sulfur reduction inside the FCCU, the naphtha hydrotreater can be operated less severely, thereby minimizing octane loss from olefin saturation and minimizing hydrogen consumption. Octane loss from olefin saturation and minimizing hydrogen consumption. This would also have a favorable economic impact to the refiner.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

For the purposes herein, and/or the Examples below, and unless otherwise stated, the terms below have the definitions indicated.

"Fresh" fluid cracking catalyst is catalyst composition, as manufactured but prior to being added to a FCC unit.

"Equilibrium" fluid cracking catalyst, "spent catalyst", or "regenerated catalyst" is the inventory of circulating catalyst composition in an FCC unit once it has reached a steady state within the environment of the FCCU.

"Simulated Equilibrium" refers to fluid cracking catalyst that has been steam treated in the laboratory to simulate an equilibrium cracking catalyst of an FCCU. One such laboratory procedure for attaining simulated equilibrium is to steam fresh catalyst, such as 1500° F. (816° C.) for 4 hours or 1420° F. (771° C.) for 16 hours with one atmosphere of steam. Such treatment simulates catalyst deactivation that is believed to be substantially the same as that of an equilibrium catalyst in a FCC unit once it has reached a steady state within the environs of a FCCU.

"CPS" is another deactivation procedure which uses propylene and air to simulate the REDOX process in addition to the steaming deactivation effect (See American Chemical Society Symposium Series, No. 634, Page 171-183 (1996).

Standard Y-type zeolite was commercially produced by crystallization of sodium silicate and sodium aluminate. This zeolite can be converted to USY-type by dealumination, which increases the silicon/aluminum atomic ratio of the parent standard Y zeolite structure. Dealumination is achieved by steam calcinations.

The rare earth (RE) exchanged zeolites used in the invention are prepared by ion exchange, during which sodium and ammonium atoms present in the zeolite structure are replaced with other cations, usually as mixtures of rare-earth metal salts such as those salts of cerium, lanthanum, neodyminum, naturally occurring rare-earths and mixtures thereof to provide REY and REUSY grades, respectively.

The surface area was measured by $N_2$ BET method and chemical analysis was performed by ion coupled plasma analysis, standardized to NIST standards.

Definitions of Abbreviations

RE refers to rare earth.
SA refers to total surface area in $m^2/g$.
ZSA refers to surface area in $m^2/g$ from the zeolite or microporosity less than 20 Angstroms.
MSA refers to surface area in $m^2/g$ from the matrix or mesoporosity greater than 20 Angstroms.
APS refers to average particle size in microns.
UCS refers to unit cell size in Angstroms.
PPM refers to parts per million.
GSR refers to gasoline sulfur reduction.
LCO refers to light cycle oil, typically have a boiling point in the range of about 220° C. to about 372° C.

EXAMPLE 1

Catalyst 1A: 4203 grams (1350 g on a dry basis) of RE-USY with 8.2% $RE_2O_3$, 0.15% $Na_2O$ was mixed with 547 g of a $ZnCl_2$ solution containing 29.6% Zinc for 10 minutes. Then, 1761 g (405 g on a dry basis) aluminum chlorohydrol and 2991 g (2542 g on a dry basis) clay were added in the above slurry and mixed for about 10 minutes. The mixture was milled in a Drais mill to reduce particle size and spray dried in a Bowen spray dryer. The spray dried particles were calcined for 1 hour at 1100° F. (593° C.). The physical and chemical properties of the finished fresh catalyst are listed on Table 1.

Catalyst 1B: 3663 grams (1200 g on a dry basis) of RE-USY with 8.2% $RE_2O_3$, 0.15% $Na_2O$ was mixed with 486 g of a $ZnCl_2$ solution containing 29.6% Zinc and 667 g of a $RECl_3$ solution containing 19.6% rare earth for 10 minutes. Then, 1565 g (360 g on a dry basis) aluminum chlorohydrol and 2447 g (2080 g on a dry basis) clay were added in the above slurry and mixed for about 10 minutes. The mixture was milled in a Drais mill to reduce particle size and spray dried in a Bowen spray dryer. The spray dried particles were calcined for 1 hour at 1100° F. (593° C.). The physical and chemical properties of the finished fresh catalyst are also listed on Table 1.

Catalyst 1C (Invention). 3663 grams (1319 g on a dry basis) of RE-USY with 8.2% $RE_2O_3$, 0.15% $Na_2O$ was mixed with 486 g of a $ZnCl_2$ solution containing 29.6% Zinc and 600 g of a $YCl_3$ solution containing 15.7% yttrium for 10 minutes. Then, 1565 g (360 g on a dry basis) aluminum chlorohydrol and 2447 g (2080 g on a dry basis) clay were added in the above slurry and mixed for about 10 minutes. The mixture was milled in a Drais mill to reduce particle size and spray dried in a Bowen spray dryer. The spray dried particles were calcined for 1 hour at 1100° F. (593° C.). The physical and chemical properties of the finished fresh catalyst are listed on Table 1.

All three catalysts were deactivated in a reactor such as that described in American Chemical Society Symposium Series, No. 634, Page 171-183 (1996) using the protocols 1-4 listed below. In addition, the catalyst 1A and 1C were also deactivated using a modified CPS deactivation protocol (protocol 4) in which no $SO_2$ was used in the oxidation cycles to rule out any significant effect of $SO_2$ on the catalysts.

Protocol 1. CPS 1450° F. (788° C.) ending on reduction.
Protocol 2. CPS 1450° F. (788° C.) ending on oxidation (calcined 1 hour at 1450° F. (788° C.) in air after CPS 1450° F. (788° C.) ending on reduction)
Protocol 3. 4 Hours at 1500° F. (816° C.) with 100% steam
Protocol 4. CPS1450° F. (788° C.) ending on reduction without $SO_2$ in the oxidation cycle.

The surface area and unit cell size after deactivations under the above protocols are also listed on Table 1. It is seen that the Catalyst 1B had poor surface area retention compared to the catalyst 1A and catalyst 1C in the first protocol (46% vs. 56 and 57%) and it had even worse surface area retention (26% vs. 42 and 45%) in protocol 3.

TABLE 1

| Catalyst | Catalyst 1A | Catalyst 1B | Catalyst 1C |
|---|---|---|---|
| Fresh Catalysts | | | |
| $Na_2O$, wt % | 0.26 | 0.20 | 0.18 |
| $Al_2O_3$, wt % | 38.94 | 37.06 | 37.75 |
| $RE_2O_3$, wt % | 2.16 | 6.22 | 2.48 |
| $Y_2O_3$, wt % | — | — | 2.08 |
| ZnO, wt % | 4.03 | 4.19 | 4.03 |
| Surface Area ($m^2$/g)—SA | 259 | 264 | 258 |
| Zeolite Surface Area ($m^2$/g)—ZSA | 219 | 229 | 228 |
| Matrix Surface Area ($m^2$/g)—MSA | 40 | 35 | 31 |
| Protocol 1 and Protocol 2[1] | | | |
| SA | 146 | 121 | 146 |
| SA Retention (%) | 56% | 46% | 57% |
| ZSA | 120 | 98 | 122 |
| MSA | 27 | 23 | 23 |
| Unit Cell Size—UCS (Å) | 24.32 | 24.47 | 24.43 |
| Protocol 3 | | | |
| SA | 109 | 69 | 116 |
| SA Retention | 42% | 26% | 45% |
| ZSA | 86 | 44 | 91 |
| MSA | 23 | 25 | 25 |
| UCS | 24.34 | 24.48 | 24.44 |
| Protocol 4 | | | |
| SA | 131 | | 165 |
| SA Retention | 51% | | 64% |
| ZSA | 110 | | 140 |
| MSA | 22 | | 25 |
| UCS | 24.31 | | 24.46 |

[1]Surface area was not measured for the products deactivated according to Protocol 2 based on an assumption that the surface area for those products would not be materially different from those products deactivated according to Protocol 1.

After each deactivation, Micro-Activity Tests (MAT) were conducted thereon according to ASTM D3907 against an equilibrium zeolite-containing catalysts (E-cat 1D), having a unit cell size of 24.30 Å, total surface area of 174 $m^2$/g, zeolite surface area of 134 $m^2$/g, and matrix surface area of 40 $m^2$/g. The E-cat 1D composition has a $Na_2O$ of 0.27%, $RE_2O_3$ of 2.58%, $Y_2O_3$ of 0.005%, and ZnO of 0.02%. The properties of the feed used in the MAT study are listed in column 2 of Table 2 below. Column 1 of Table 2 provides a range of values for certain properties found in typical FCC feeds.

TABLE 2

| | 1-Typical Range | 2-Feed A |
|---|---|---|
| API Gravity @ 60° F. (16° C.) | 15-35 | 26.6 |
| Aniline Point, ° F. | | 182 (83° C.) |
| Sulfur wt % | 0.01-4 | 1.047 |
| Total Nitrogen wt % | 0.02-0.3 | 0.060 |
| Basic Nitrogen wt % | 0.008-0.1 | 0.0308 |
| Conradson Carbon wt % | 0-6 | 0.23 |
| K Factor | 11-12.5 | 11.59 |
| Specific Gravity @ 60° F. (16° C.) | | 0.8949 |
| Refractive Index | | 1.5003 |
| Average Molecular Weight | | |
| Aromatic Ring Carbons, Ca wt % | | |
| Paraffinic Carbons, Cp, wt % | | |
| Naphthenic, Cn, wt % | | |
| Distillation, Initial Boiling Point, ° F. (° C.) | | |
| IBP | | 358 (181) |
| 5 | | 464 (240) |
| 10 | 290-600 | 511 (266) |
| 20 | | 579 (304) |
| 30 | | 626 (330) |
| 40 | | 673 (356) |
| 50 | 600-900 | 716 (380) |
| 60 | | 765 (407) |
| 70 | | 804 (429) |
| 80 | | 865 (463) |
| 90 | 800-1200 | 937 (503) |
| 95 | | 1006 (541) |

Figure 2:
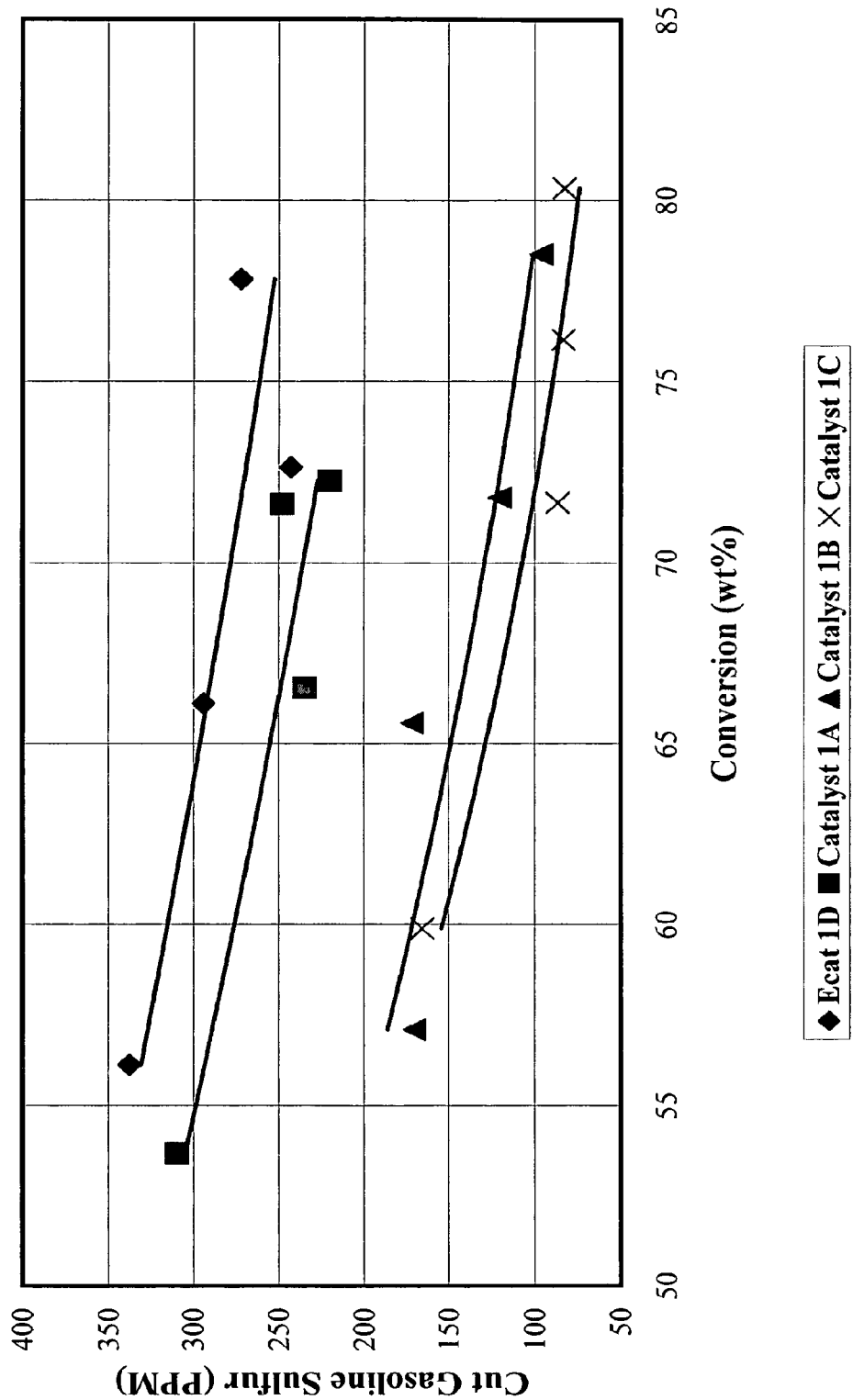
FIG. 2 illustrates hydrocarbon conversion (wt %) and cut gasoline sulfur reduction performance of the invention (Catalyst 1C of Example 1) versus a base equilibrium catalyst (E-cat 1D) and other catalysts (Catalyst 1A & 1B) using deactivation Protocol 2 described later below (CPS 1450° F. (788° C.) ending on oxidation).
Figure 3:
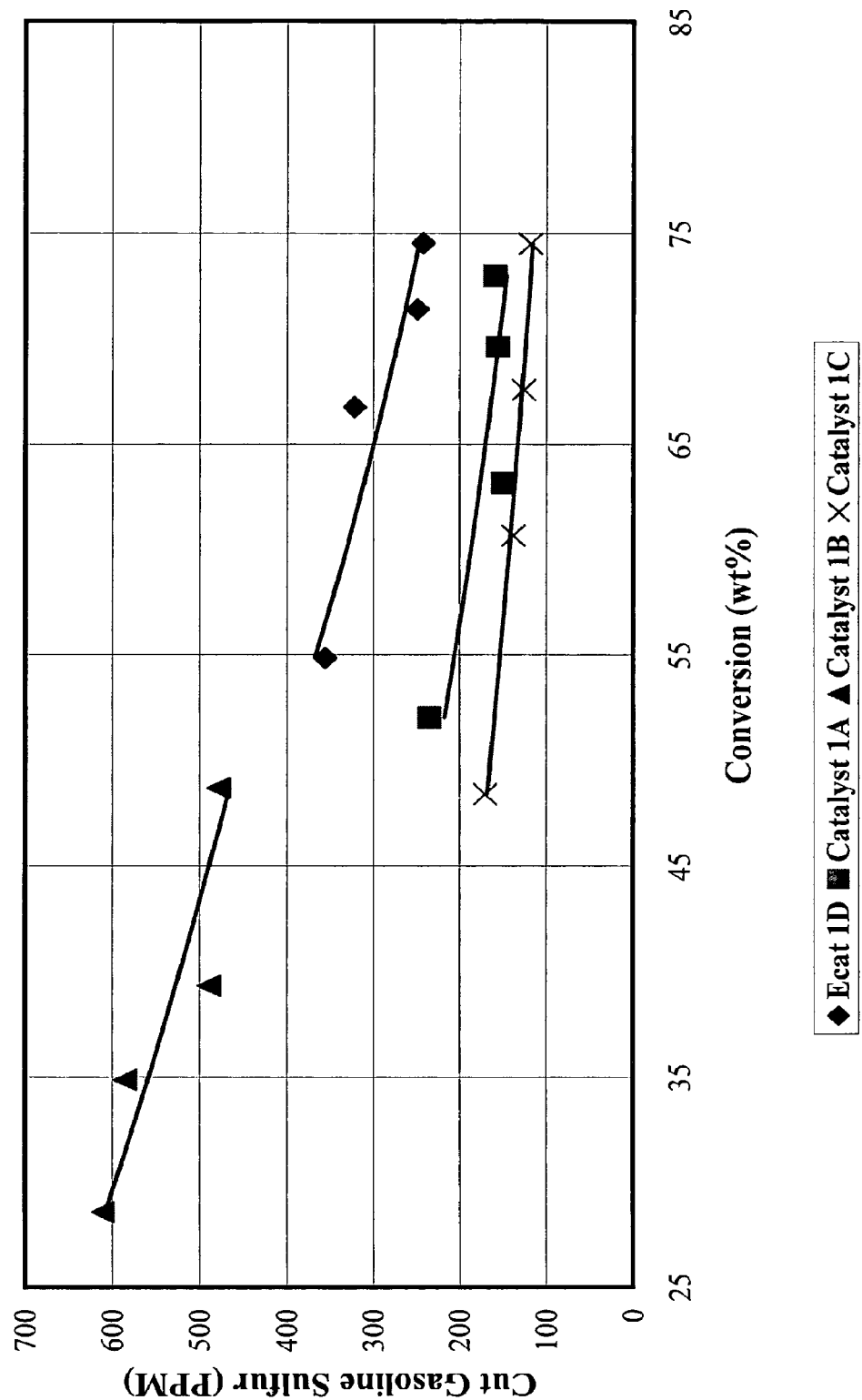
FIG. 3 illustrates hydrocarbon conversion (wt %) and cut gasoline sulfur reduction performance of the invention (Catalyst 1C of Example 1) versus a base equilibrium catalyst (E-cat 1D) and other catalysts (Catalyst 1A & 1B) using deactivation Protocol 3 described later below (4 hours at 1500° F. (816° C.) 100% Steam).

The products of the cracked feed, sulfur content in the gasoline and sulfur reduction results at 70% (65% for Protocol 3) conversion using catalysts deactivated per protocols 1-3 are shown in Tables 3-5 and FIGS. 1-3.

Figure 4:
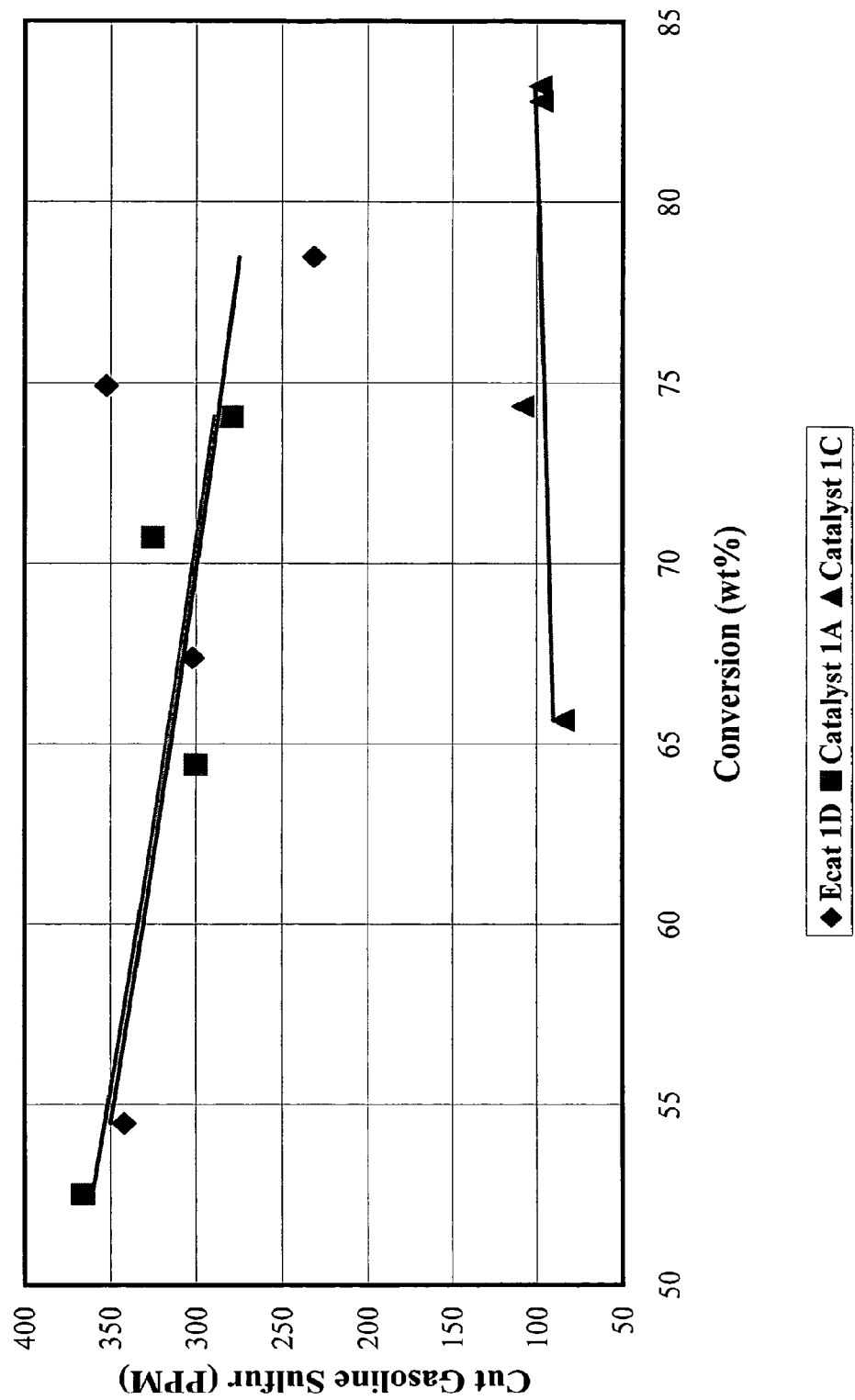
FIG. 4 illustrates hydrocarbon conversion (wt %) and cut gasoline sulfur reduction performance of the invention (Catalyst 1C of Example 1) versus a base equilibrium catalyst (E-cat 1D) and other catalyst (Catalyst 1A) using deactivation Protocol 1 described later below (CPS 1450° F. (788° C.) ending on reduction without $SO_2$).

The products of the cracked feed, sulfur content in the gasoline and sulfur reduction results at 70% conversion of deactivation protocol 4 are shown in Table 6 and FIG. 4.

The gasoline sulfur concentration reported above was analyzed by an Agilient 6890 gas chromatograph with an atomic emission detector G2350A (sulfur GC-AED) using techniques similar to those described in Albro et al., "Quantitative Determination of Sulfur Compounds in FCC Gasolines By AED-A study of the Effect of Catalyst Type and Catalytic Conditions on Sulfur Distribution", *Journal of High Resolution Chromatography*, Vol. 16, January 1993. To reduce experimental errors in the sulfur concentration associated with fluctuations in distillation cut point of gasoline, the sulfur species ranging from thiophene to C4-thiophene in syncrude (excluding benzothiophene and higher boiling S species) were quantified and the sum was defined as "cut gasoline sulfur". Similarly, sulfur species ranging from thiophene to C2-thiophene was defined as "light cut gasoline sulfur" and sulfur species ranging from C3-thiophene to C4-thiophene as "heavy cut gasoline sulfur". When benzothiophene is included in the sulfur report, it is referred to as "total gasoline sulfur".

The negative values reported in the SULFUR REDUCTION section of Table 3 and 6 were interpolated from data, such as shown in FIGS. 1 to 4. The negative values in theory indicate that sulfur content increased by the amount shown and at a conversion rate of 70%. However, it is not believed that this data reflects a significant increase in sulfur, if indeed it reflects an actual increase in sulfur at all.

TABLE 3

(Protocol 1)
Conversion 70

| | E-cat 1D | Catalyst 1A | Catalyst 1B | Catalyst 1C |
|---|---|---|---|---|
| Catalyst to Oil Ratio | 3.97 | 4.01 | 3.48 | 2.94 |
| Cracked Products Content (wt %) | | | | |
| Hydrogen | 0.10 | 0.18 | 0.21 | 0.27 |
| Tot C1 + C2 | 1.31 | 1.25 | 1.47 | 1.54 |
| Total C3's | 5.51 | 5.06 | 5.10 | 4.74 |
| Total C4s | 11.25 | 10.50 | 9.90 | 8.87 |
| Gasoline | 47.39 | 48.92 | 47.60 | 47.77 |
| LCO | 25.34 | 24.90 | 23.94 | 24.04 |
| Bottoms | 4.44 | 4.81 | 5.48 | 5.13 |
| Coke | 4.18 | 3.87 | 5.17 | 6.18 |
| SULFUR COMPONENTS, ppm S, GASOLINE BASIS | | | | |
| Thiophene | 43 | 40 | 33 | 30 |
| MethylThiophenes | 92 | 92 | 66 | 51 |
| TetrahydroThiophene | 22 | 16 | 13 | 12 |
| C2-Thiophenes | 106 | 108 | 74 | 59 |
| Thiophenol | 36 | 30 | 23 | 22 |
| C3-Thiophenes | 35 | 46 | 23 | 14 |
| MethylThiophenol | 73 | 63 | 39 | 32 |
| C4-Thiophenes | 56 | 55 | 28 | 18 |
| BenzoThiophene | 342 | 317 | 297 | 251 |
| Light Cut Sulfur | 264 | 257 | 187 | 153 |
| Heavy Cut Sulfur | 91 | 102 | 51 | 33 |
| Cut Gasoline Sulfur | 356 | 360 | 240 | 189 |
| Total Sulfur | 700 | 680 | 541 | 443 |
| LCO Sulfur - (LCO Basis) | 20284 | 19541 | 17561 | 15808 |
| SULFUR REDUCTIONS, % | | | | |
| Light Cut Sulfur | | 2.5 | 29.2 | 42.0 |
| Heavy Cut Sulfur | | −12.1 | 44.1 | 63.5 |
| Cut Gasoline Sulfur | | −1.4 | 32.5 | 46.9 |
| Total Sulfur | | 2.8 | 22.7 | 36.6 |
| LCO Sulfur - (LCO Basis) | | 3.7 | 13.4 | 22.1 |

TABLE 4

(Protocol 2)
Conversion 70

| | E-cat 1D | Catalyst 1A | Catalyst 1B | Catalyst 1C |
|---|---|---|---|---|
| Catalyst to Oil Ratio | 3.47 | 3.80 | 3.46 | 2.96 |
| Cracked Products Content (wt %) | | | | |
| Hydrogen | 0.08 | 0.29 | 0.34 | 0.45 |
| Tot C1 + C2 | 1.36 | 1.38 | 1.62 | 1.84 |
| Total C3's | 5.97 | 5.53 | 5.41 | 5.30 |
| Total C4s | 12.40 | 11.61 | 11.12 | 10.54 |
| Gasoline | 45.65 | 46.49 | 44.24 | 43.99 |
| LCO | 24.32 | 24.61 | 23.09 | 22.93 |
| Bottoms | 4.78 | 5.18 | 5.90 | 5.74 |
| Coke | 3.73 | 4.49 | 6.54 | 7.11 |
| SULFUR COMPONENTS, ppm S, GASOLINE BASIS | | | | |
| Thiophene | 38 | 32 | 26 | 23 |
| MethylThiophenes | 86 | 75 | 48 | 41 |
| TetrahydroThiophene | 16 | 11 | 7 | 6 |
| C2-Thiophenes | 87 | 76 | 35 | 29 |
| Thiophenol | 30 | 27 | 20 | 19 |
| C3-Thiophenes | 21 | 16 | 7 | 4 |
| MethylThiophenol | 58 | 52 | 24 | 20 |
| C4-Thiophenes | 25 | 24 | 1 | 0 |
| BenzoThiophene | 350 | 325 | 292 | 263 |

TABLE 4-continued (Protocol 2)
Conversion 70

| | E-cat 1D | Catalyst 1A | Catalyst 1B | Catalyst 1C |
|---|---|---|---|---|
| Light Cut Sulfur | 230 | 195 | 117 | 101 |
| Heavy Cut Sulfur | 47 | 40 | 10 | 5 |
| Cut Gasoline Sulfur | 278 | 236 | 129 | 107 |
| Total Sulfur | 635 | 563 | 426 | 374 |
| 700° F. (371°) LCO, LCO Basis | 7924 | 7286 | 6158 | 5652 |
| SULFUR REDUCTIONS, % | | | | |
| Light Cut Sulfur | | 15.1 | 49.0 | 56.2 |
| Heavy Cut Sulfur | | 14.2 | 78.0 | 88.7 |
| Cut Gasoline Sulfur | | 15.3 | 53.6 | 61.4 |
| Total Sulfur | | 11.4 | 32.9 | 41.0 |
| 700° F. (371° C.) LCO, LCO Basis | | 8.0 | 22.3 | 28.7 |

TABLE 5

(Protocol 3)
Conversion 65

| | E-cat 1D | Catalyst 1A | Catalyst 1B | Catalyst 1C |
|---|---|---|---|---|
| Catalyst to Oil Ratio | 2.94 | 3.28 | 10.71 | 3.47 |
| Cracked Products Content (wt %) | | | | |
| Hydrogen | 0.06 | 0.37 | 0.97 | 0.53 |
| Tot C1 + C2 | 1.18 | 1.32 | 2.39 | 1.77 |
| Total C3's | 4.91 | 4.92 | 6.84 | 4.82 |
| Total C4s | 10.34 | 10.02 | 14.87 | 9.61 |
| Gasoline | 44.37 | 42.18 | 42.62 | 39.44 |
| LCO | 28.24 | 26.76 | 30.57 | 25.46 |
| Bottoms | 5.85 | 7.19 | 9.88 | 8.30 |
| Coke | 3.40 | 5.43 | 9.70 | 7.91 |
| SULFUR COMPONENTS, ppm S, GASOLINE BASIS | | | | |
| Thiophene | 34 | 24 | 29 | 21 |
| MethylThiophenes | 82 | 51 | 85 | 44 |
| TetrahydroThiophene | 20 | 8 | 5 | 4 |
| C2-Thiophenes | 97 | 50 | 105 | 43 |
| Thiophenol | 32 | 20 | 42 | 12 |
| C3-Thiophenes | 31 | 16 | 70 | 13 |
| MethylThiophenol | 61 | 46 | 59 | 19 |
| C4-Thiophenes | 33 | 16 | 85 | 1 |
| BenzoThiophene | 291 | 269 | 367 | 248 |
| Light Cut Sulfur | 235 | 133 | 222 | 114 |
| Heavy Cut Sulfur | 64 | 35 | 156 | 17 |
| Cut Gasoline Sulfur | 300 | 170 | 376 | 133 |
| Total Sulfur | 597 | 442 | 705 | 383 |
| SULFUR REDUCTIONS, % | | | | |
| Light Cut Sulfur | | 43.3 | | 51.8 |
| Heavy Cut Sulfur | | 45.7 | | 72.5 |
| Cut Gasoline Sulfur | | 43.4 | | 55.8 |
| Total Sulfur | | 25.9 | | 35.8 |

TABLE 6

(Protocol 4)
Conversion 70

|  | E-cat 1D | Catalyst 1A | Catalyst 1C |
|---|---|---|---|
| Catalyst to Oil Ratio | 3.33 | 3.87 | 2.40 |
| Cracked Products Content (wt %) | | | |
| Hydrogen | 0.10 | 0.20 | 0.33 |
| Tot C1 + C2 | 1.44 | 1.24 | 1.80 |
| Total C3's | 5.77 | 5.24 | 4.85 |
| Total C4s | 11.89 | 11.34 | 9.52 |
| Gasoline | 45.85 | 47.82 | 46.32 |
| LCO | 24.06 | 24.65 | 24.18 |
| Bottoms | 4.71 | 4.94 | 5.15 |
| Coke | 3.99 | 3.88 | 6.65 |
| SULFUR COMPONENTS, ppm S, GASOLINE BASIS | | | |
| Thiophene | 33 | 39 | 27 |
| MethylThiophenes | 85 | 86 | 39 |
| TetrahydroThiophene | 17 | 18 | 4 |
| C2-Thiophenes | 97 | 92 | 19 |
| Thiophenol | 27 | 34 | 13 |
| C3-Thiophenes | 32 | 23 | 3 |
| MethylThiophenol | 56 | 65 | 14 |
| C4-Thiophenes | 30 | 34 | 0 |
| BenzoThiophene | 301 | 351 | 326 |
| Light Cut Sulfur | 232 | 241 | 90 |
| Heavy Cut Sulfur | 62 | 58 | 3 |
| Cut Gasoline Sulfur | 299 | 302 | 93 |
| Total Sulfur | 609 | 665 | 420 |
| SULFUR CONVERSIONS, % | | | |
| Light Cut Sulfur |  | −3.7 | 61.4 |
| Heavy Cut Sulfur |  | 6.1 | 95.0 |
| Cut Gasoline Sulfur |  | −0.8 | 69.0 |
| Total Sulfur |  | −9.3 | 31.0 |

From the results, the following can be concluded:
a. Gasoline sulfur reduction activities of the Catalyst 1A were dramatically affected by deactivation protocol.
b. Gasoline sulfur reduction activities of the Catalyst 1B were improved over the catalyst 1A. However, due to poor surface area retention in the protocol 3, no sulfur reduction was achieved.
c. Gasoline sulfur reduction activities of the Catalyst 1C is preferred among the three catalyst for all four deactivation protocols.

EXAMPLE 2

5000 g Na-Y zeolite was exchanged with ammonium sulfate to lower the $Na_2O$ content to ~4%. Then, 4.62% yttrium was exchanged on the washed Na—Y zeolite by slurrying one part of the zeolite and 10 parts of $YCl_3$ solution that contains 0.051 part of yttrium at pH 5 for 20 minutes followed by filtering and rinsing with 30 parts of deionized water. The exchange zeolite was dried overnight at 120° C. followed by calcination of 2 hours at 1150° F. (621° C.). The calcined zeolite was exchanged again with ammonium sulfate to lower the $Na_2O$ content to ~0.69%.

A starting base catalyst was made by mixing 3767 grams (1500 g on a dry basis) of the yttrium exchanged zeolite above with 400 g deionized water, 2391 g (550 g on a dry basis) aluminum chlorohydrol and 3471 g (2950 g on a dry basis) clay for about 10 minutes. The mixture was milled in a Drais mill to reduce particle size and spray dried in a Bowen spray dryer. The finished catalysts were calcined and exchanged using ammonium sulfate to lower the $Na_2O$ content. The physical and chemical properties of the starting base catalyst are listed on Table 7.

Five catalysts were made by incipient wetness impregnation of $ZnCl_2$ and $YCl_3$ solutions using the starting base catalyst above.

Catalyst 2A: 100 g of the starting base catalyst were impregnated to a Zn level of 1.84% followed by a calcination of 1 hour at 1100° F. (593° C.).

Catalyst 2B: 100 g of the starting base catalyst were impregnated to a Zn level of 2.90% followed by a calcination of 1 hour at 1100° F. (593° C.).

Catalyst 2C: 100 g of the starting base catalyst were impregnated to a Zn level of 2.73% and additional 0.91% yttrium followed by a calcination of 1 hour at 1100° F. (593° C.).

Catalyst 2D: 100 g of the starting base catalyst were impregnated to a Zn level of 2.77% and additional 1.88% yttrium followed by a calcination of 1 hour at 1100° F. (593° C.).

Catalyst 2E: 100 g of the starting base catalyst were impregnated to a Zn level of 2.46% and additional 3.9% yttrium followed by a calcination of 1 hour at 1100° F. (593° C.).

All five catalysts were deactivated according to CPS1450° F. (788° C.). The physical and chemical properties of the five catalysts after the deactivation and the fresh starting base catalysts are listed on Table 7.

TABLE 7

| | Catalyst | | | | | |
|---|---|---|---|---|---|---|
| | Starting Base Catalyst | Catalyst 2A | Catalyst 2B | Catalyst 2C | Catalyst 2D | Catalyst 2F |
| $Na_2O$, wt % | 0.11 | 0.10 | 0.10 | 0.09 | 0.09 | 0.09 |
| $Al_2O_3$, wt % | 42.57 | 41.85 | 41.25 | 40.75 | 40.57 | 38.85 |
| $Y_2O_3$, wt % | 1.51 | 1.45 | 1.45 | 2.67 | 3.9 | 6.5 |
| ZnO, wt % | 0 | 2.29 | 3.61 | 3.4 | 3.45 | 3.06 |
| | Fresh | CPS 1450° F. (788° C.) | | | | |
| SA ($m^2/g$) | 252 | 165 | 165 | 171 | 170 | 156 |
| SA Retention (%) |  | 65% | 65% | 68% | 67% | 62% |
| ZSA ($m^2/g$) | 181 | 114 | 114 | 125 | 121 | 112 |
| MSA ($m^2/g$) | 71 | 51 | 51 | 46 | 49 | 44 |
| UCS (Å) |  | 24.29 | 24.29 | 24.37 | 24.41 | 24.44 |

Figure 5:
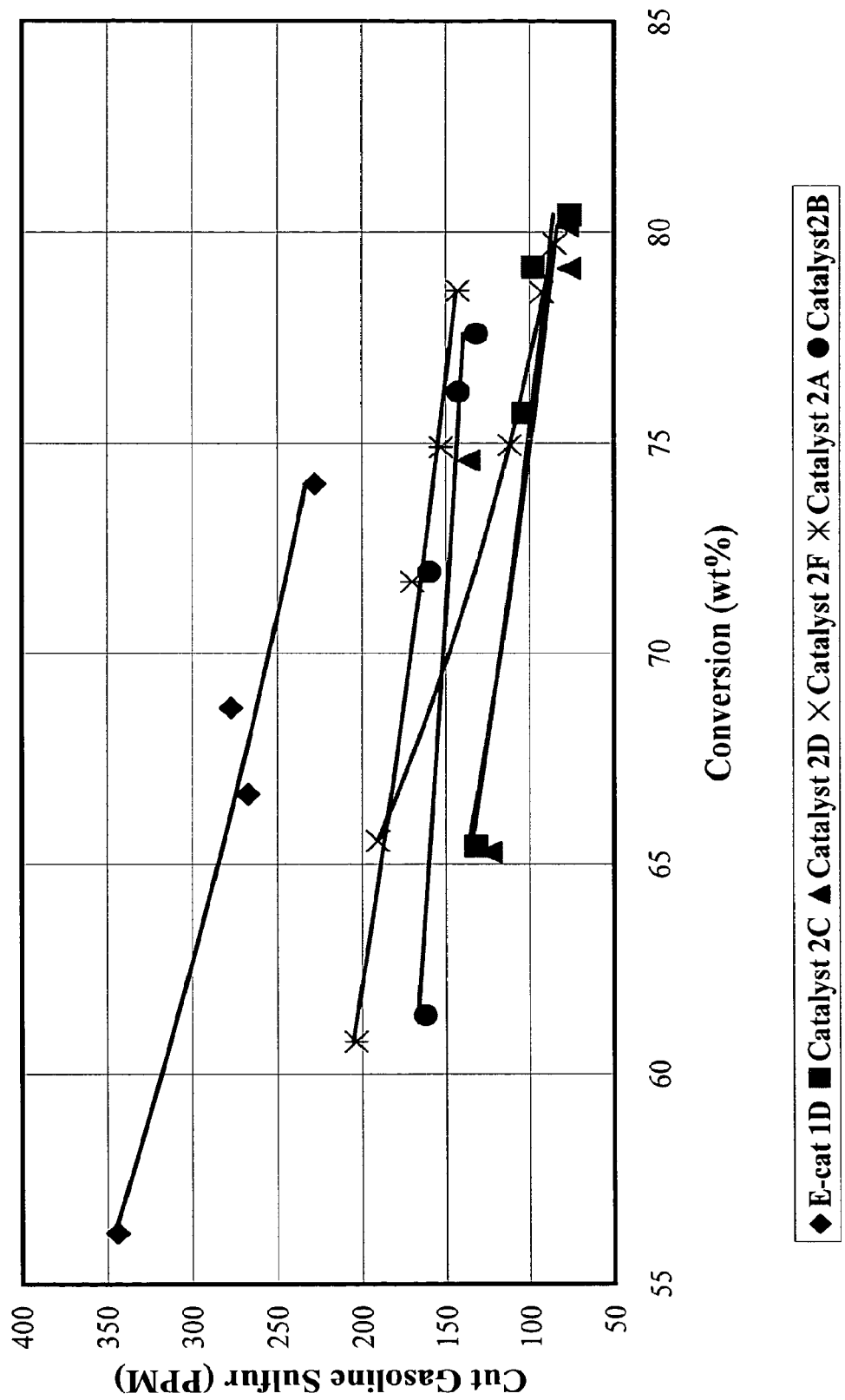
FIG. 5 illustrates the effect of zinc concentration and yttrium concentration on the invention with respect to its cut gasoline sulfur reduction as further described in Example 2.
Figure 6:
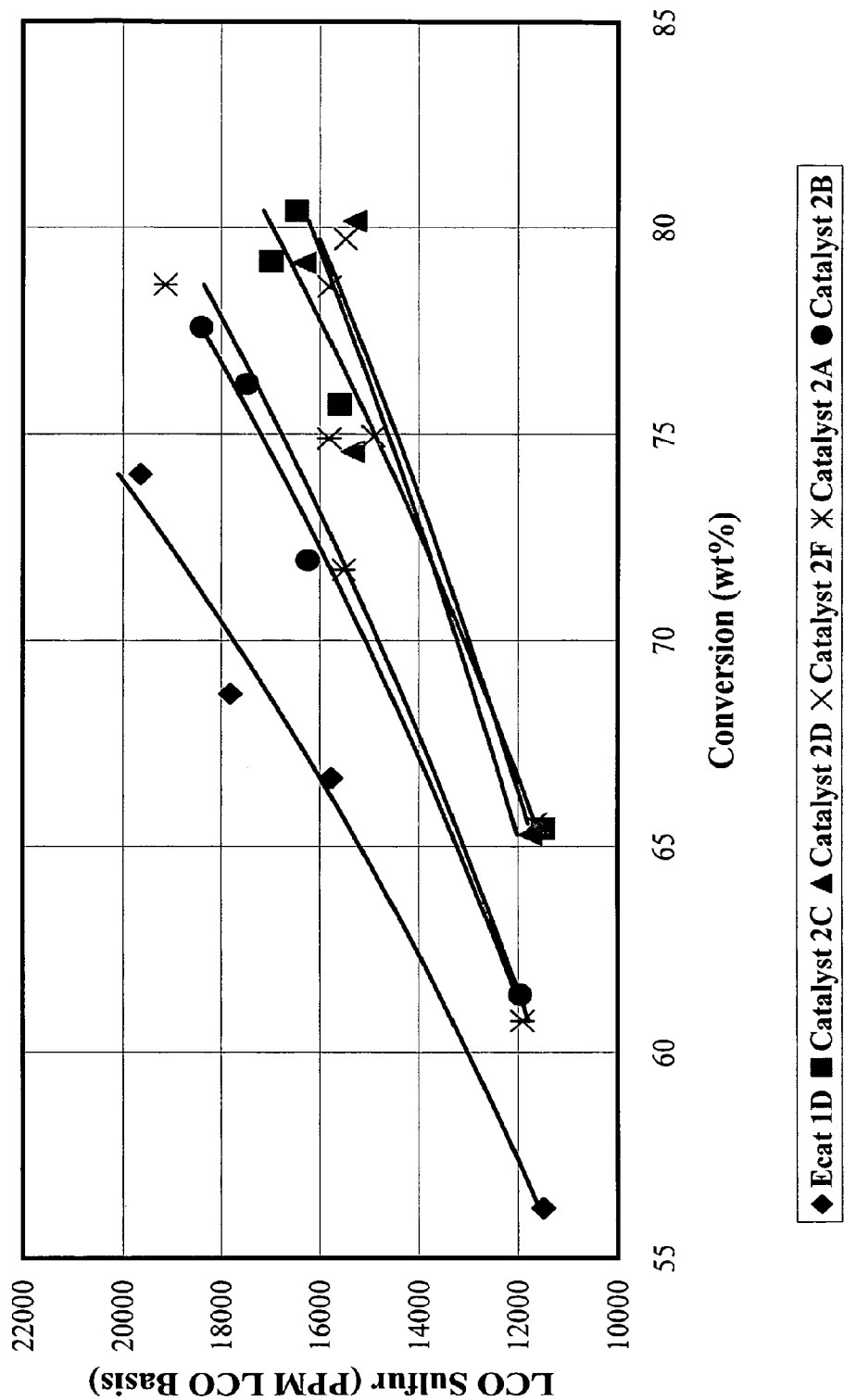
FIG. 6 illustrates the effect of zinc concentration and yttrium concentration on the invention with respect to its LCO sulfur reduction as further described in Example 2.

It is seen that the unit cell size increased with higher loading of yttrium while surface area retention ranges from 62% to 68%. All five deactivated catalysts were tested in a MAT against the commercial equilibrium catalyst 1D. The products of the cracked feed, sulfur content in the gasoline and sulfur reduction results at 70% conversion are listed in Table 8, FIG. 5 and FIG. 6.

At about the same yttrium loading and lower Zn loading, Catalyst 2A is less active in sulfur reduction than that of Catalyst 2B (33% vs. 41% cut gasoline sulfur reduction). At about the same Zn loading, the initial increase of yttrium from ~1.14% to ~2.1% (Catalyst 2B vs. 2C) improves cut gasoline sulfur reduction from ~41% to 54%. A further increase of yttrium from ~2.1% to 3.07% did not enhance cut gasoline sulfur reduction, and a further yttrium loading to 5.12% appears to decrease gasoline sulfur reduction activity.

TABLE 8

| Conversion | 70 E-cat 1D | Catalyst 2A | Catalyst 2B | Catalyst 2C | Catalyst 2D | Catalyst 2F |
|---|---|---|---|---|---|---|
| Catalyst to Oil Ratio | 3.97 | 3.03 | 3.02 | 2.45 | 2.50 | 2.48 |
| Cracked Products Content (wt %) | | | | | | |
| Hydrogen | 0.10 | 0.22 | 0.22 | 0.24 | 0.24 | 0.19 |
| Tot C1 + C2 | 1.33 | 1.36 | 1.32 | 1.50 | 1.53 | 1.36 |
| Total C3's | 5.50 | 4.84 | 4.68 | 4.76 | 4.67 | 4.47 |
| Total C4s | 11.23 | 9.30 | 9.19 | 8.61 | 8.55 | 8.16 |
| Gasoline | 47.40 | 48.77 | 48.76 | 48.93 | 48.34 | 49.57 |
| LCO | 25.42 | 24.71 | 24.50 | 24.88 | 25.01 | 25.33 |
| Bottoms | 4.32 | 4.41 | 4.61 | 4.42 | 4.36 | 4.08 |
| Coke | 4.18 | 4.92 | 5.09 | 5.45 | 6.21 | 5.76 |
| SULFUR COMPONENTS, ppm S, GASOLINE BASIS | | | | | | |
| Thiophene | 36 | 25 | 23 | 20 | 20 | 23 |
| MethylThiophenes | 81 | 56 | 49 | 37 | 37 | 44 |
| TetrahydroThiophene | 17 | 9 | 9 | 9 | 8 | 9 |
| C2-Thiophenes | 67 | 48 | 38 | 34 | 34 | 35 |
| Thiophenol | 27 | 20 | 22 | 19 | 15 | 25 |
| C3-Thiophenes | 21 | 10 | 12 | 5 | 6 | 12 |
| MethylThiophenol | 55 | 34 | 32 | 23 | 24 | 43 |
| C4-Thiophenes | 30 | 19 | 16 | 8 | 8 | 22 |
| BenzoThiophene | 355 | 283 | 279 | 253 | 258 | 263 |
| 700° F. (371° C.) LCO, (LCO basis) | 17737 | 14817 | 15080 | 13079 | 13220 | 12983 |
| Light Cut Sulfur | 202 | 140 | 122 | 103 | 102 | 113 |
| Heavy Cut Sulfur | 52 | 31 | 29 | 14 | 15 | 34 |
| Cut Gasoline Sulfur | 255 | 171 | 152 | 118 | 117 | 148 |
| Total Sulfur | 612 | 457 | 433 | 374 | 377 | 418 |
| SULFUR REDUCTIONS, % | | | | | | |
| Light Cut Sulfur | | 30.6 | 39.6 | 49.1 | 49.3 | 44.2 |
| Heavy Cut Sulfur | | 41.6 | 45.0 | 72.9 | 71.2 | 34.3 |
| Cut Gasoline Sulfur | | 33.0 | 40.5 | 53.8 | 53.9 | 41.8 |
| Total Sulfur | | 25.3 | 29.3 | 39.0 | 38.4 | 31.7 |
| 700° F. (371° C.) LCO, (LCO basis) | | 16.5 | 15.0 | 26.3 | 25.5 | 26.8 |

EXAMPLE 3

The same starting base catalyst in the Example 2 was impregnated with 1.23% yttrium using YCl₃ solution to incipient wetness followed by calcinations of 1 hour at 1100° F. (593° C.). The finished catalyst is named Catalyst 3A. Three additional catalysts were made by incipient wetness impregnation of Catalyst 3A using ZnCl₂ solution.

Catalyst 3B: 110 g of catalyst 3A were impregnated to a Zn level of 2.39% followed by a calcination of 1 hour at 1100° F. (593° C.).

Catalyst 3C: 110 g of catalyst 3A were impregnated to a Zn level of 3.16% followed by a calcination of 1 hour at 1100° F. (593° C.).

Catalyst 3D: 110 g of catalyst 3A were impregnated to a Zn level of 3.97% followed by a calcination of 1 hour at 1100° F. (593° C.).

All four catalysts were deactivated 16 hours at 1420° F. (771° C.) with 100% steam. The physical and chemical properties of the four catalysts after the deactivation are listed in Table 9.

Figure 7:
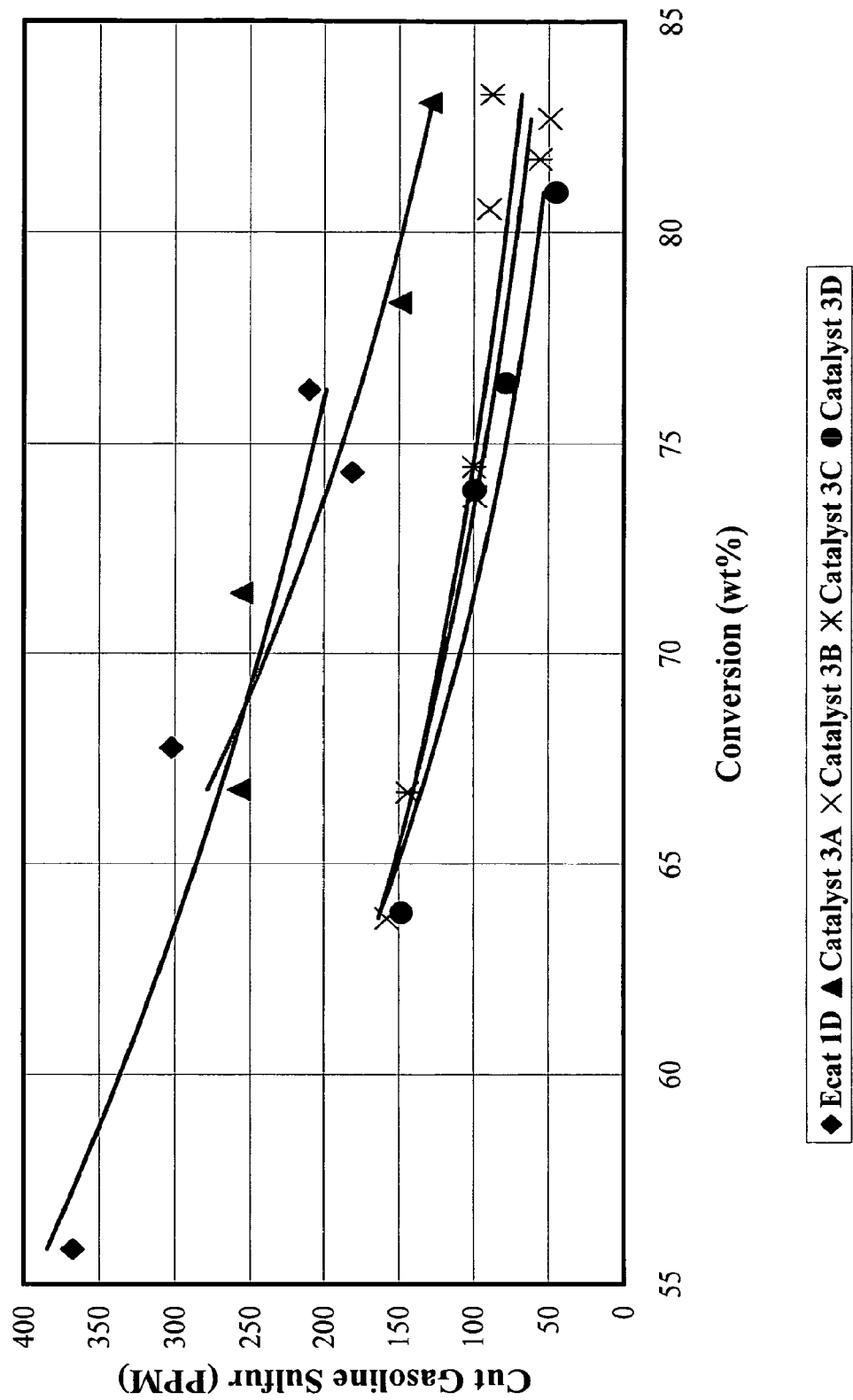
FIG. 7 illustrates the effect of the invention versus catalysts that do not contain both, e.g., zinc, and yttrium on cut gasoline sulfur reduction as further described in Example 3.
Figure 8:
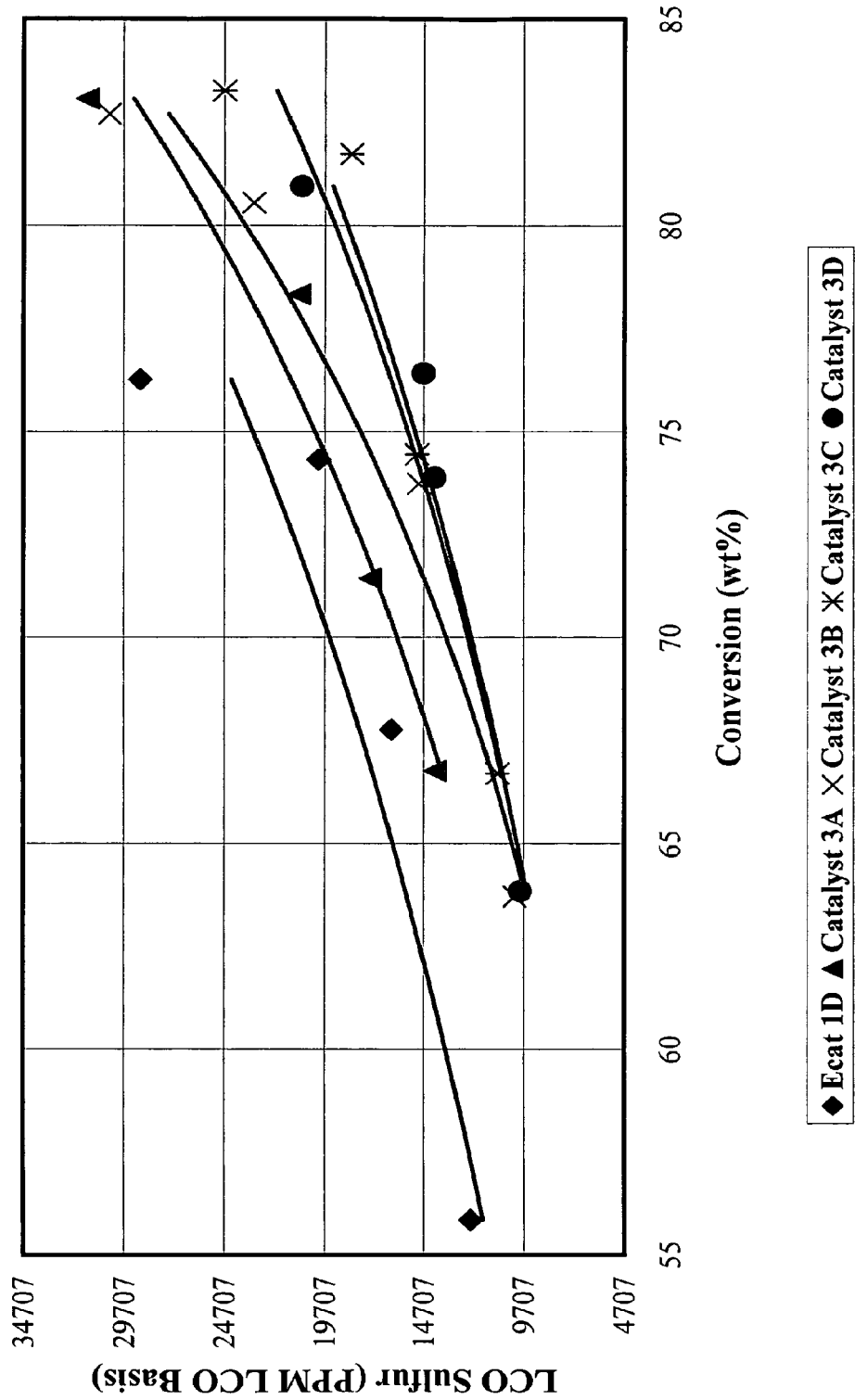
FIG. 8 illustrates the effect of the invention versus catalysts that do not contain both, e.g., zinc, and yttrium on LCO sulfur reduction as further described in Example 3.

All four catalysts were tested in a MAT against the commercial equilibrium catalyst 1D. The products of the cracked feed, sulfur content in the gasoline and sulfur reduction results at 75% conversion are listed in Table 10, FIG. 7 and FIG. 8. It is seen that without zinc, Catalyst 3A had almost no activity for reducing gasoline sulfur. The increase in Zn loading from 2.39% to 3.97% improves the cut gasoline sulfur reduction.

TABLE 9

| Catalyst | Catalyst 3A | Catalyst 3B | Catalyst 3C | Catalyst 3D |
|---|---|---|---|---|
| Na₂O, wt % | 0.13 | 0.13 | 0.17 | 0.12 |
| Al₂O₃, wt % | 42.73 | 41.69 | 41.11 | 41.47 |
| Y₂O₃, wt % | 3.07 | 2.81 | 2.85 | 2.77 |
| ZnO, wt % | 0.03 | 2.98 | 3.94 | 4.95 |
| 16 Hours at 1420° F. (771° C.) 100% Steam | | | | |
| SA (m²/g) | 173 | 165 | 166 | 159 |
| ZSA (m²/g) | 128 | 122 | 107 | 121 |
| MSA (m²/g) | 44 | 43 | 59 | 38 |
| UCS (m²/g) | 24.36 | 24.4 | 24.39 | 24.4 |

TABLE 10

| | Conversion 75 | | | | |
|---|---|---|---|---|---|
| | E-cat 1D | Catalyst 3A | Catalyst 3B | Catalyst 3C | Catalyst 3D |
| Catalyst to Oil Ratio | 4.23 | 3.22 | 3.19 | 2.98 | 3.39 |

TABLE 10-continued

Conversion 75

|  | E-cat 1D | Catalyst 3A | Catalyst 3B | Catalyst 3C | Catalyst 3D |
|---|---|---|---|---|---|
| Cracked Products Content (wt %) | | | | | |
| Hydrogen | 0.11 | 0.13 | 0.37 | 0.38 | 0.47 |
| Tot C1 + C2 | 1.58 | 2.27 | 2.07 | 2.04 | 1.97 |
| Total C3's | 6.52 | 6.09 | 5.66 | 5.62 | 5.50 |
| Total C4s | 13.64 | 12.31 | 11.51 | 11.21 | 11.27 |
| Gasoline | 48.77 | 48.05 | 46.66 | 47.36 | 46.80 |
| LCO | 21.56 | 20.87 | 20.49 | 20.68 | 20.93 |
| Bottoms | 3.59 | 3.31 | 3.45 | 3.39 | 3.46 |
| Coke | 4.52 | 5.44 | 7.87 | 7.45 | 8.37 |
| SULFUR COMPONENTS, ppm S, GASOLINE BASIS | | | | | |
| Thiophene | 18 | 23 | 11 | 17 | 12 |
| MethylThiophenes | 54 | 52 | 26 | 32 | 25 |
| TetrahydroThiophene | 4 | 1 | 1 | 0 | 0 |
| C2-Thiophenes | 55 | 52 | 28 | 27 | 24 |
| Thiophenol | 21 | 18 | 17 | 17 | 12 |
| C3-Thiophenes | 28 | 23 | 9 | 7 | 8 |
| MethylThiophenol | 43 | 31 | 21 | 19 | 14 |
| C4-Thiophenes | 47 | 30 | 14 | 10 | 6 |
| BenzoThiophene | 413 | 382 | 347 | 303 | 287 |
| Light Cut Sulfur | 132 | 134 | 67 | 80 | 63 |
| Heavy Cut Sulfur | 75 | 53 | 23 | 17 | 15 |
| Cut Gasoline Sulfur | 207 | 188 | 92 | 98 | 79 |
| Total Sulfur | 620 | 590 | 456 | 410 | 376 |
| LCO, (LCO Basis) | 23285 | 20185 | 17923 | 15494 | 15132 |
| SULFUR CONVERSIONS, % | | | | | |
| Light Cut Sulfur |  | −1.8 | 49.0 | 39.0 | 52.1 |
| Heavy Cut Sulfur |  | 28.7 | 68.8 | 77.9 | 80.5 |
| Cut Gasoline Sulfur |  | 9.2 | 55.5 | 52.7 | 62.0 |
| Total Sulfur |  | 4.8 | 26.4 | 33.8 | 39.4 |
| LCO, (LCO Basis) |  | 13.3 | 23.0 | 33.5 | 35.0 |

EXAMPLE 4

Four catalysts were manufactured as below.

Catalyst 4A. 7520 grams (2400 g on a dry basis) of RE-USY with 8.2% $RE_2O_3$, ~1% $Na_2O$ was mixed with 973 g of a $ZnCl_2$ solution containing 29.6% Zinc for 10 minutes. Then, 3130 g (720 g on a dry basis) aluminum chlorohydrol and 5318 g (4520 g on a dry basis) clay were added in the above slurry and mixed for about 10 minutes. The mixture was milled in a Drais mill to reduce particle size and spray dried in a Bowen spray dryer. The spray dried particles were calcined for 40 minutes at 750° F. (399° C.) and followed by an ammonium sulfate exchange to lower $Na_2O$. The physical and chemical properties of the finished catalyst are listed on Table 11.

Catalyst 4B. 5641 grams (1800 g on a dry basis) of the same RE-USY with 8.2% $RE_2O_3$, ~1% $Na_2O$ was mixed with 730 g of a $ZnCl_2$ solution containing 29.6% Zinc and 389 g $RECl_3$ solution containing 23% rare earth for 10 minutes. Then, 2348 g (540 g on a dry basis) aluminum chlorohydrol and 3865 g (3285 g on a dry basis) clay were added in the above slurry and mixed for about 10 minutes. The mixture was milled in a Drais mill to reduce particle size and spray dried in a Bowen spray dryer. The spray dried particles were calcined for 40 minutes at 750° F. (399° C.) and followed by an ammonium sulfate exchange to lower $Na_2O$. The physical and chemical properties of the finished catalyst are listed on Table 11.

Catalyst 4C. (Invention) 4700 grams (1500 g on a dry basis) of the same RE-USY with 8.2% $RE_2O_3$, ~1% $Na_2O$ was mixed with 608 g of a $ZnCl_2$ solution containing 29.6% Zinc and 729 g $YCl_3$ solution containing 9.44% yttrium for 10 minutes. Then, 1957 g (450 g on a dry basis) aluminum chlorohydrol and 3221 g (2738 g on a dry basis) clay were added in the above slurry and mixed for about 10 minutes. The mixture was milled in a Drais mill to reduce particle size and spray dried in a Bowen spray dryer. The spray dried particles were calcined for 40 minutes at 750° F. (399° C.) and followed by an ammonium sulfate exchange to lower $Na_2O$. The physical and chemical properties of the finished catalyst are listed on Table 11.

Catalyst 4D. (Invention). 1806 grams (1560 g on a dry basis) of the Yttrium-USY described in Example 3 was mixed with 2660 g of deionized $H_2O$ and 632 g $ZnCl_2$ solution containing 29.6% Zinc and 758 g $YCl_3$ solution containing 9.44% yttrium for 10 minutes. Then, 2035 g (468 g on a dry basis) aluminum chlorohydrol and 3349 g (2847 g on a dry basis) clay were added in the above slurry and mixed for about 10 minutes. The mixture was milled in a Drais mill to reduce particle size and spray dried in a Bowen spray dryer. The spray dried particles were calcined for 40 minutes at 750° F. (399° C.) and followed by an ammonium sulfate exchange to lower $Na_2O$. The physical and chemical properties of the finished catalyst are listed on Table 11.

All four catalysts were steam deactivated 16 hours at 1420° F. (771° C.) with 100% steam. The surface area and unit cell size of the four catalysts after the deactivation are listed in Table 11.

TABLE 11

| Catalyst | Catalyst 4A | Catalyst 4B | Catalyst 4C | Catalyst 4D |
|---|---|---|---|---|
| $Na_2O$ | 0.20 | 0.18 | 0.18 | 0.2 |
| $Al_2O_3$ | 40.37 | 38.84 | 38.95 | 38.77 |
| $Re_2O_3$ | 2.35 | 3.81 | 2.53 | — |
| $Y_2O_3$ | — | — | 1.74 | 3.61 |
| ZnO | 4.43 | 4 | 3.83 | 3.77 |
| SA | 275 | 282 | 294 | 271 |
| ZSA | 222 | 243 | 258 | 239 |
| MSA | 53 | 39 | 36 | 32 |
| 16 Hours at 1420° F. (771° C.), 100% Steam | | | | |
| SA | 187 | 182 | 206 | 212 |
| SA Retention | 68% | 65% | 70% | 78% |
| ZSA | 143 | 131 | 157 | 164 |
| MSA | 44 | 51 | 49 | 48 |
| UCS | 24.36 | 24.41 | 24.43 | 24.45 |

Figure 9:
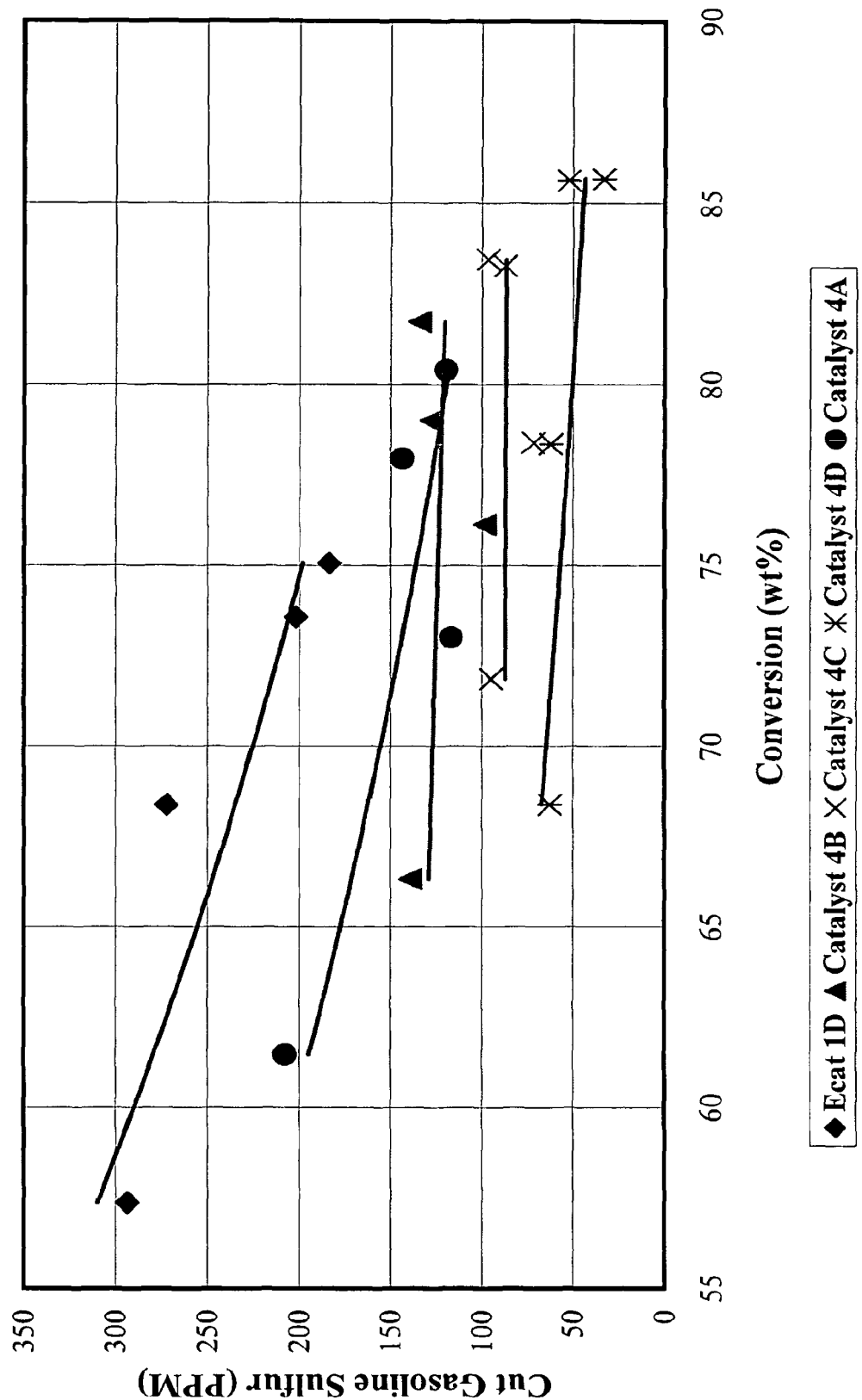
FIG. 9 illustrates the hydrocarbon conversion (wt %) and cut gasoline sulfur reduction performance of the invention (Catalyst 4C and 4D of Example 4) versus a base equilibrium catalyst (E-cat 1D) and other catalysts (Catalyst 4A & 4B).
Figure 10:
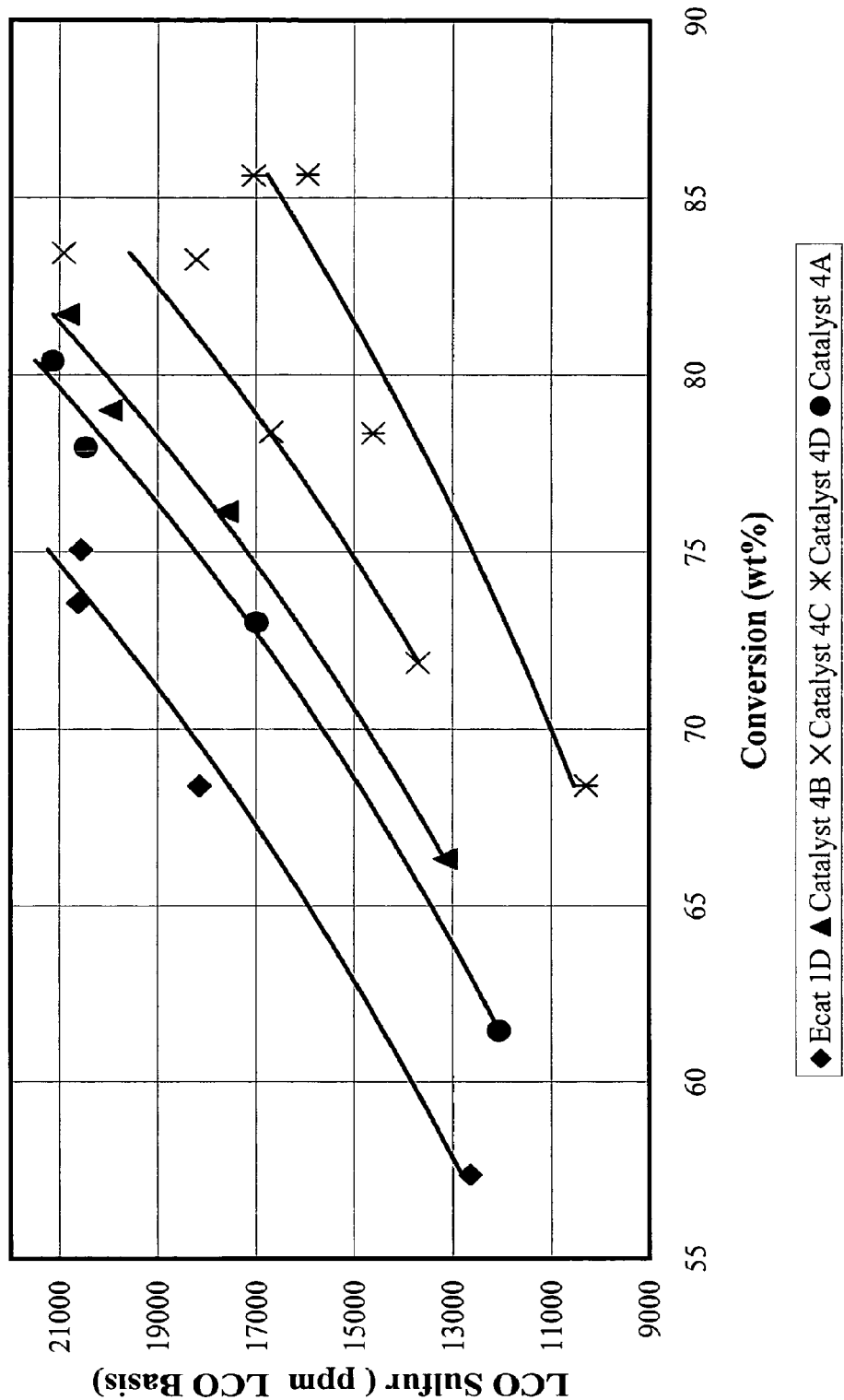
FIG. 10 illustrates the hydrocarbon conversion (wt %) and LCO sulfur reduction performance of the invention (Catalyst 4C and 4D of Example 4) versus a base equilibrium catalyst (E-cat 1D) and other catalysts (Catalyst 4A & 4B).

It is seen that the surface area retention of the catalysts containing zinc and yttrium is generally better than that of zinc and rare earth. After deactivation, all four catalysts were tested in a MAT against the commercial equilibrium catalyst 1D. The products of the cracked feed, sulfur content in the gasoline and sulfur reduction results at 75% conversion are listed in Table 12, FIG. 9 and FIG. 10.

The results clearly show that while both additional rare earth and yttrium enhanced the gasoline sulfur reduction activity of Zn catalyst yttrium is much more effective than rare earth. The cut gasoline sulfur reduction is ~31% for the Catalyst 4A, 37% for the Catalyst 4B, 56% for Catalyst 4C, and 71% for the Catalyst 4D.

TABLE 12

| | E-cat 1D | Catalyst 4A | Catalyst 4B | Catalyst 4C | Catalyst 4D |
|---|---|---|---|---|---|
| Conversion 75 | | | | | |
| Catalyst to Oil Ratio | 4.32 | 3.51 | 3.04 | 2.38 | 2.62 |
| Hydrogen | 0.12 | 0.26 | 0.26 | 0.30 | 0.40 |
| Tot C1 + C2 | 1.67 | 1.81 | 1.76 | 1.97 | 2.26 |
| Total C3's | 6.62 | 5.90 | 5.54 | 5.44 | 5.28 |
| Total C4s | 13.91 | 12.14 | 11.38 | 10.58 | 10.34 |
| Gasoline | 48.66 | 48.54 | 48.94 | 49.30 | 46.50 |
| LCO | 21.76 | 20.62 | 20.80 | 21.22 | 20.35 |
| Bottoms | 3.59 | 3.65 | 3.50 | 3.40 | 3.48 |
| Coke | 4.37 | 5.81 | 6.45 | 7.11 | 9.39 |
| SULFUR COMPONENTS, ppm S GASOLINE BASIS | | | | | |
| Thiophene | 33 | 25 | 22 | 18 | 14 |
| MethylThiophenes | 74 | 49 | 42 | 31 | 20 |
| TetrahydroThiophene | 11 | 7 | 7 | 6 | 2 |
| C2-Thiophenes | 47 | 34 | 29 | 22 | 13 |
| Thiophenol | 23 | 19 | 21 | 19 | 12 |
| C3-Thiophenes | 15 | 9 | 8 | 1 | 1 |
| MethylThiophenol | 47 | 34 | 36 | 24 | 12 |
| C4-Thiophenes | 18 | 11 | 14 | 7 | 1 |
| BenzoThiophene | 355 | 311 | 286 | 254 | 214 |
| Light Cut Sulfur | 165 | 115 | 101 | 78 | 53 |
| Heavy Cut Sulfur | 33 | 20 | 23 | 9 | 3 |
| Cut Gasoline Sulfur | 198 | 137 | 124 | 87 | 57 |
| Total Sulfur | 552 | 450 | 412 | 342 | 272 |
| LCO, ppm S (wt) LCO Basis | 21202 | 18226 | 17189 | 15072 | 12589 |
| SULFUR REDUCTIONS, % OF BASE CATALYST | | | | | |
| Light Cut Sulfur | | 30.3 | 38.9 | 52.9 | 67.8 |
| Heavy Cut Sulfur | | 39.3 | 32.4 | 73.8 | 89.7 |
| Cut Gasoline Sulfur | | 31.2 | 37.3 | 56.1 | 71.3 |
| Total Sulfur | | 18.4 | 25.3 | 38.0 | 50.7 |
| LCO, ppm S (wt) LCO Basis | | 14.0 | 18.9 | 28.9 | 40.6 |

What is claimed is:

1. A method of reducing the sulfur content of a catalytically cracked petroleum fraction, which comprises catalytically cracking a petroleum feed fraction containing organosulfur compounds at elevated temperature in the presence of a cracking catalyst comprising zeolite, yttrium, and at least one element selected from the group consisting of zinc, magnesium, and manganese, wherein the yttrium and the element are present as cations exchanged onto the zeolite; and further wherein the catalyst composition comprises 0.1 to about 12% by weight yttrium, measured as $Y_2O_3$.

2. A method according to claim 1 wherein the catalyst comprises about 0.1 to about 14% by weight of the element.

3. A method according to claim 2 wherein the catalyst further comprises rare earth.

4. A method according to claim 1 wherein the catalyst comprises about 1.5 to about 5% by weight zinc and about 0.5 to about 5% by weight yttrium.

5. A method according to claim 4 wherein the catalyst comprises a zeolite Y that is a member selected from the group consisting of rare earth Y zeolite, ultrastable Y zeolite, and calcined rare earth Y zeolite.

6. A method according to claim 1 wherein the catalyst further comprises rare earth.

7. A method according to claim 1 wherein the catalyst further comprises lanthana, ceria, or mixtures thereof.

8. A method according to claim 1 wherein the catalyst comprises zeolite Y.

9. A method according to claim 1, wherein the cracking catalyst optionally comprises a matrix and, if yttrium is present in pores of the matrix, up to 25% of the yttrium in the catalyst composition is present in said pores.

10. In a fluid catalytic cracking process in which a hydrocarbon feed comprising organosulfur compounds is catalytically cracked to lighter products by contact in a cyclic catalyst recirculation cracking process with a circulating fluidizable catalytic cracking catalyst inventory consisting of particles having a size ranging from about 20 to about 100 microns, comprising: (i) catalytically cracking the feed in a catalytic cracking zone operating at catalytic cracking conditions by contacting feed with a source of regenerated cracking catalyst to produce a cracking zone effluent comprising cracked products and spent catalyst containing coke and strippable hydrocarbons; (ii) discharging and separating the effluent mixture into a cracked product rich vapor phase and a solids rich phase comprising spent catalyst; (iii) removing the vapor phase as a product and fractionating the vapor to form liquid cracking products including gasoline, (iv) stripping the solids rich spent catalyst phase to remove occluded hydrocarbons from the catalyst, (v) transporting stripped catalyst to a catalyst regenerator; (vi) regenerating stripped catalyst by contact with oxygen containing gas to produce regenerated catalyst; and (vii) recycling the regenerated catalyst to the cracking zone to contact further quantities of hydrocarbon feed, the improvement which comprises reducing the sulfur content of a the gasoline portion of the liquid cracking products, by catalytically cracking the feed fraction at elevated temperature in the presence of a product sulfur reduction catalyst which comprises zeolite, yttrium, and least one element selected from the group consisting of zinc, magnesium, and manganese, wherein the yttrium and element are present as cations exchanged onto the zeolite; and further wherein the product sulfur reduction catalyst comprises 0.1 to about 12% by weight yttrium, measured as $Y_2O_3$.

11. A method according to claim 10 wherein the product sulfur reduction catalyst comprises about 0.1 to about 14% by weight zinc.

12. A method according to claim 11 wherein the product sulfur reduction catalyst further comprises rare earth.

13. A method according to claim 10 wherein the product sulfur reduction catalyst comprises about 1.5 to about 5% by weight zinc and about 0.5 to about 5% by weight yttrium.

14. A method according to claim 13 wherein the product sulfur reduction catalyst comprises a zeolite Y that is a member selected from the group consisting of rare earth Y zeolite, ultrastable Y zeolite, and calcined rare earth Y zeolite.

15. A method according to claim 10 wherein the product sulfur reduction catalyst further comprises rare earth.

16. A method according to claim 10 wherein the product sulfur reduction catalyst further comprises lanthana, ceria, or mixtures thereof.

17. A method according to claim 16 wherein the product sulfur reduction catalyst comprises clay and alumina.

18. A method according to claim 10 wherein the product sulfur reduction catalyst comprises zeolite Y.

19. A method according to claim 10 wherein the product sulfur reduction catalyst further comprises matrix and optionally binder.

20. A method according to claim 10, wherein the product sulfur reduction catalyst optionally comprises a matrix and, if yttrium is present in pores of the matrix, up to 25% of the yttrium in the catalyst composition is present in said pores.

* * * * *